INVENTORS
JOHN W. RICHTER
HARVEY H. HOEHN

March 2, 1971 J. W. RICHTER ET AL 3,567,632
PERMSELECTIVE, AROMATIC, NITROGEN-CONTAINING
POLYMERIC MEMBRANES
Filed Aug. 8, 1969 3 Sheets-Sheet 3
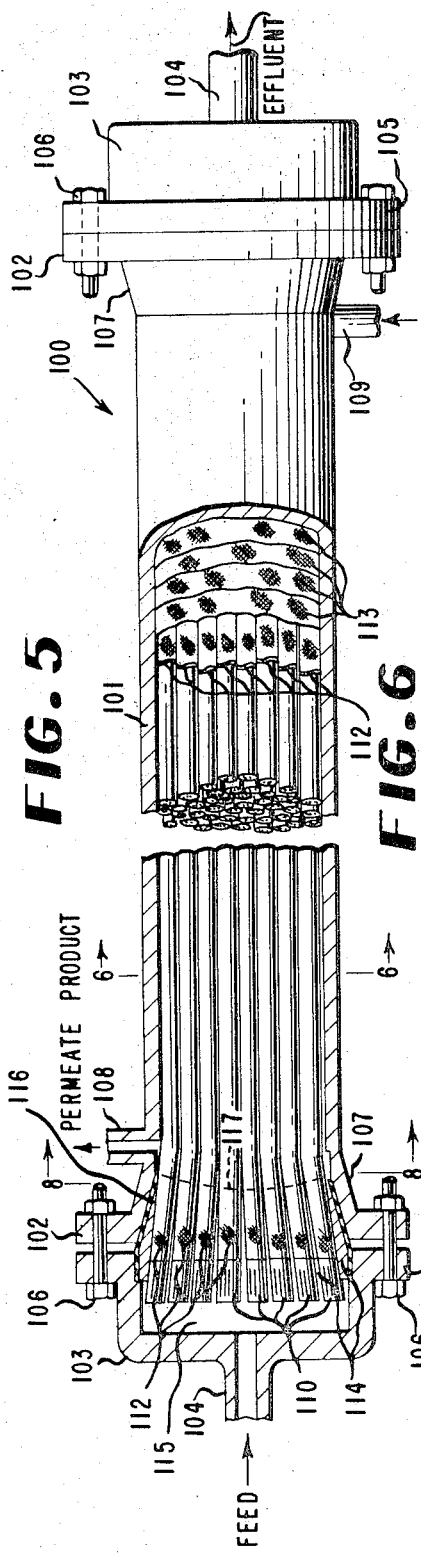
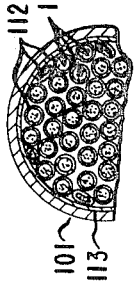
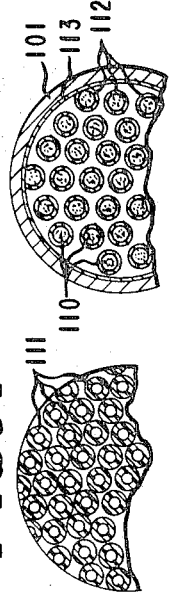
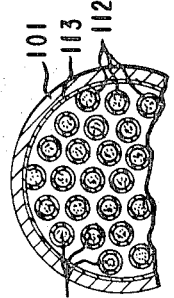
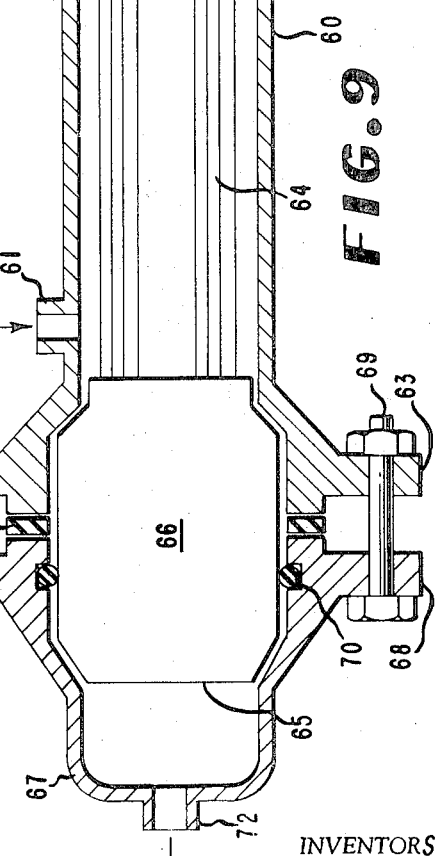
INVENTORS
JOHN W. RICHTER
HARVEY H. HOEHN
BY
*Gary A. Samuels*
ATTORNEY

United States Patent Office 3,567,632
Patented Mar. 2, 1971

3,567,632
PERMSELECTIVE, AROMATIC, NITROGEN-CONTAINING POLYMERIC MEMBRANES
John William Richter, Kennett Square, and Harvey Herbert Hoehn, Hockessin, Del., assignors to E. I. du Pont de Nemours and Company, Wilmington, Del.
Continuation-in-part of application Ser. No. 757,272, Sept. 4, 1968. This application Aug. 8, 1969, Ser. No. 848,611
Int. Cl. B01d 13/00
U.S. Cl. 210—23
40 Claims

ABSTRACT OF THE DISCLOSURE

Permselective barriers or membranes prepared from synthetic, organic, nitrogen-linked aromatic polymers of the formula —LR— where L is a selected nitrogen-containing functional linkage such as an amide linkage, and R is a selected aromatic-containing linkage such as phenylene. The membranes are useful in separating components of fluid mixtures or solutions such as water containing dissolved salts.

CROSS-REFERENCE TO RELATED APPLICATION

This application is a continuation-in-part of application S.N. 757,272 filed Sept. 4, 1968, now abandoned.

BACKGROUND OF THE INVENTION (1) Field of the invention

This invention relates to permselective barriers or membranes for the selective separation of fluid mixtures and solutions. More particularly, this invention is directed to such barriers that are prepared from a class of synthetic, organic, nitrogen-linked aromatic polymers and have utility for separating components of aqueous solutions, a principal example being the reverse osmosis desalination of sea water; to processes for preparing such membranes; and to processes and apparatus for using the membranes.

(2) Description of the prior art

Permselective barriers, i.e., membranes which preferentially permeate certain components of a fluid mixture while restraining other components, have long been known. Likewise, the principle of reverse osmosis, wherein a hydrostatic pressure in excess of the equilibrium osmotic pressure is applied to a fluid mixture in contact with a permselective barrier in order to force the more permeable component(s) through the barrier in preference to the less permeable component(s) to thus achieve a separation of components (contrary to the normal osmotic flow) is also old in the art. However, within the past few years, a substantial growth of interest and active research has occurred in this field, particularly directed to desalination of brackish water and sea water on a practical scale.

Although reverse osmosis desalination has several advantages (one being its low-energy requirements) over competitive water-purification processes such as distillation, evaporation/compression, freeze-crystallization, etc., it has been difficult to find permselective barriers that simultaneously exhibit high permeability to water (high water flux), low permeability to dissolved ions (low salt passage), high mechanical strength in order to survive high operating pressures, commonly of the order of 1000 p.s.i. (70 kg./cm.²), and long-term stability in use.

At present, cellulose acetate is commonly employed as the preferred material from which permselective barriers are prepared, based on its good combination of high water flux and low salt passage. However, cellulose acetate barriers possess two serious deficiencies in that they have a limited operating lifetime, and exhibit decay of performance during operation. The former deficiency is "chemical" in nature in that (a) water flux and salt passage are relatively sensitive functions of the degree of acetylation of the material and the hydrolysis (deacetylation) rate, in turn, is a function of pH of the feed solution, which must therefore be held (e.g., by chemical buffering) in a preferred range to achieve even modest life times; and (b) cellulose acetate is subject to biological attack and molecular-weight degradation when in contact with commonly occurring feed waters. The "decay of performance" deficiency is at least partly "mechanical" in origin, for most cellulose acetate barriers are prepared as membranes alleged to have a thin, dense "skin" layer (which provides adequate salt rejection) overlying a relatively porous substrate (which provides mechanical support with minimum deterrent to water flux). However, during operation at the high pressures required for reverse osmosis, this porous substrate exhibits a non-recoverable loss in thickness (at a rate dependent on pressure, temperature, etc.), which collapse occasions an undesirable decrease in water flux. Accordingly, in recent years alternate permselective barrier materials have actively been sought. For example, aliphatic polyamide resins, commonly called nylon, which are known to be more durable than cellulose acetate, have been investigated, but it has been found that they do not have as good overall permeation properties as cellulose acetate. In Research and Development Progress Report No. 150 of the Office of Saline Water (October 1965), Lonsdale et al. report that highly hydrophilic substituted nylons have water permeabilities nearly equal to those of cellulose acetate, but their physical strength is substantially inferior. On the other hand, nylons which are free of hydrophilic substitution have good strength, but their water permeabilities and salt rejections were found to be inferior to those of cellulose acetate.

In Research and Development Progress Report No. 167, Office of Saline Water, U.S. Department of the Interior (February 1966), there is described extensive research on the development of desalination films from polyacrylonitrile, polymethacrylonitrile and poly(vinylene carbonate). This work was undertaken in an effort to develop reverse osmosis membranes superior to cellulose acetate membranes. While not complete, the work so far has been unsuccessful in its objective. In the 1966 Saline Water Conversion Report of the Office of Saline Water, U.S. Department of the Interior, data are given for membranes prepared from polyurethane (page 81) and poly (hydroxyethyl methacrylate) (p. 82) which indicate that they have overall permeation properties inferior to those of cellulose acetate. Numerous other polymers have been tested with unsuccessful results reported in the literature.

DESCRIPTION OF THE INVENTION

It has now been discovered that excellent permselective barriers can be prepared from synthetic organic nitrogen-linked aromatic polymers represented by the formula:

—(LR)$_n$— where (a) each I independently is a divalent linking group of the formula —(A$_j$B$_j$A$_k$B$_l$A$_m$)— wherein
 (1) A is

and B is

or vice versa; each X independently is O or S; each Z independently is H, lower alkyl, or phenyl, provided that at least about ¼ of the Z's in the polymer are H; and all non-terminal

occur in pairs;

(2) $i$ and $j$ each represent the numerals 1 or 2; $k$, $l$, and $m$ each represent the numerals 0, 1, or 2; provided that if $l=0$, then $m=0$; and if $k=0$, then $l=0$; and further that $i+j+k+l+m \leq 8$.

(b) each R independently is a divalent organic radical, both of whose terminal atoms are carbon atoms, at least about ½ of all such terminal atoms bonded to $$\begin{matrix} X \\ \| \\ -C- \end{matrix}$$

and at least about ⅔ of all such terminal atoms bonded to

in the L links being members of aromatic nuclei; and such that (1) $(\bar{N}_R)/(\bar{s})$ is less than about 10,
(2) $f_M$ is less than about ⅕, and
(3) P.I. is less than about 1/500, where:

$N_R = N_R^\circ - 10N_I - N_H$
$N_R^\circ =$ (number of atoms in R, exclusive of H-atoms) $\leq 50$
$N_I =$ number of ionic groups in R
$N_H =$ number of H-bonding units contributed by polar groups in R
$\bar{N}_R =$ average value of $N_R$ for the polymer,
$s = ½$ [(number of

groups in L) +1]
$\bar{s} =$ average value of $s$ for the polymer $$f_m = \frac{\text{(number of single-strand } -M- \text{ links in the polymer/chain)}}{\text{(total number of atoms, exclusive of H-atoms in polymer chain)}}$$

M = any atom in R linking the polymer chain solely through two single bonds, $$P.I. = \frac{\text{(total number of pendent ionic groups in the polymer)}}{\text{(polymer molecular weight)}}$$

(c) $n$ is an integer sufficiently large to provide film-forming molecular weight, and (d) the polymer has a solubility of at least about 10% by weight in a medium consisting of 0–3% by weight of lithium chloride in a solvent selected from the group consisting of dimethylacetamide, dimethyl sulfoxide, N-methyl pyrrolidone, hexamethyl phosphoramide, and mixtures thereof at 25° C.

Preferably, the polymers have an index of refraction in excess of 1.60. Particularly preferred permselective barriers may be prepared from these polymers in the form of asymmetric membranes, characterized as having a thin, dense skin layer, identified by having a Crystal Violet surface dyeability less than about 0.5, overlying a relatively porous substrate identified by having a p-nitroaniline dyeability of at least about 0.7. Such asymmetric membranes exhibit reverse osmotic aqueous desalination performances superior to that of cellulose acetate, having high water flux, low salt passage, and excellent hydrolytic, mechanical, and thermal stability plus resistance to biological attack.

BRIEF DESCRIPTION OF THE DRAWINGS

FIG. 5 is a partial longitudinal sectional view of a preferred permeator for fluid separation with parts broken away to show the details of its construction.

FIG. 6 is a partial transverse cross-sectional view taken along line 6—6 of FIG. 5.

FIG. 7 is a greatly enlarged view of a group of hollow fibers of the unit shown in FIG. 6.

FIG. 8 is a partial transverse cross-sectional view taken along line 8—8 of FIG. 5.

FIG. 9 is a diagrammatic, longitudinal, sectional view of a particlularly preferred permeator for fluid separation.

Figure 1:
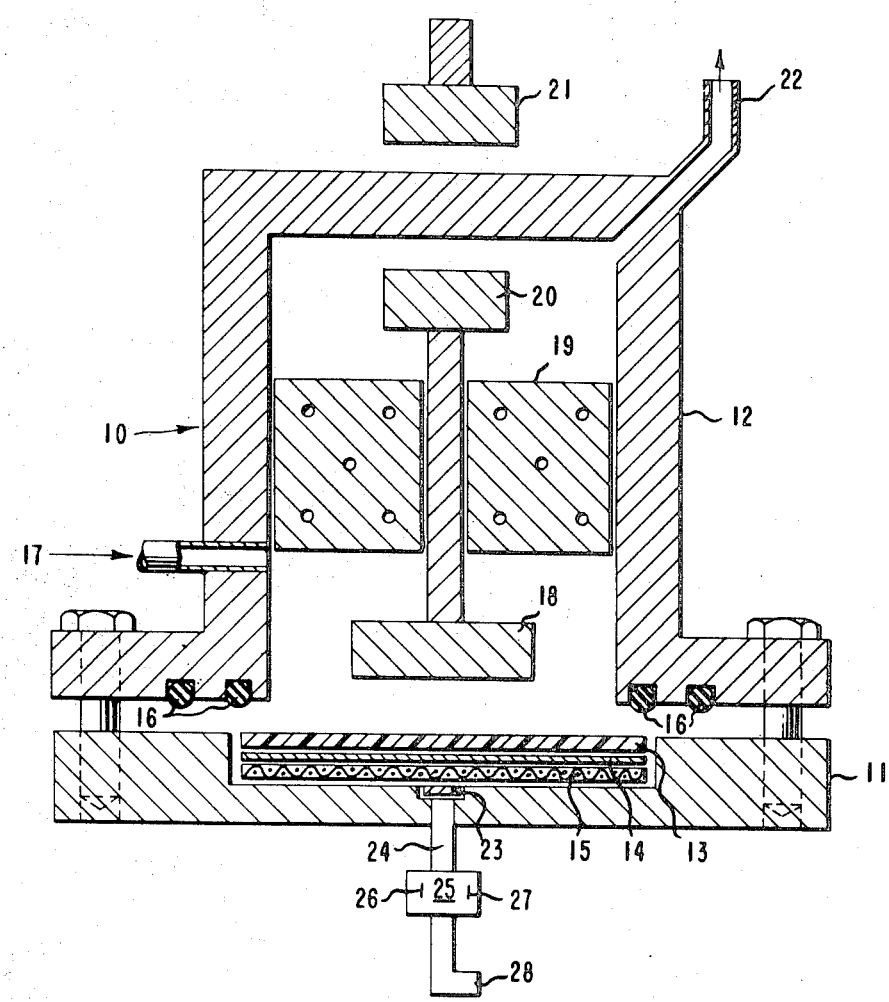
FIG. 1 is a diagrammatical elevation in section of a permation test cell useful for measuring the permeation properties of permselective barriers in thin film form.

(1) Description of the synthetic organic nitrogen-linked aromatic polymers

The polymers used to prepare the permselective barriers of this invention are chosen from a limited class of synthetic, organic, nitrogen-linked aromatic polymers having a unique balance of properties which ideally suit them for reverse osmosis desalination applications. Surprisingly, these barriers exhibit high water fluxes, even though polymers of this class do not exhibit outstandingly high moisture absorption. (The property of "high moisture absorption" is employed in the art as a screening test for candidate barrier polymers, since this parameter correlates with water-solubility in the polymers, which, according to permeability theory, should be maximized for highest water flux.) Even more surprising, these barriers provide very low salt passage, in spite of the fact that this class of polymers is known to interact strongly with certain ions (e.g., the solubility of certain ionizable halide salts in aprotic solvents increases when these polymers are dissolved in the system), which according to theory should lead to increased salt passage.

A more complete understanding of the definition of the class of polymers operable in the present invention may be obtained from the following discussion.

"Synthetic" has the usual connotation of "man-made," e.g. prepared by condensation of small difunctional molecules to form a high molecular weight polymer. "Organic" means composed substantially of C, H, O, N, and S, with minor amounts of other atoms also permitted.

The general formula, $—(LR)_n—$, designates a substantially linear polymer in which divalent linking groups L alternate with divalent organic radicals R.

(A) The divalent linking groups L, as they are encountered along the polymer chain, are each independently chosen from a limited number of structures having the formula $$—(A_iB_jA_kB_lA_m)—$$

Within each L, every A is either

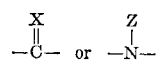

the non-elected structure becoming B for that L. Thus, the multiplicity of A's and B's within any given L are all identical, except that each X is independently chosen to be O or S (preferably oxygen) and each Z is independently chosen to be H, lower alkyl (i.e., a 1 to 4 C atom radical) or phenyl, provided that at least about ¼ and preferably all of the Z's in the polymer are H. The previously stated numerical limitations on the subscripts provide that every L must contain at least one A and one B, but no more than a total of 8 (A's and B's), and that no more than two A's or two B's can occur consecutively. Whenever L terminates in

the adjacent element in L may be either

for another

however, whenever

occurs internally, it must occur only in pairs, i.e., two adjacent

groups flanked by

groups.

It is evident from the above restrictions that only a limited number of structures for L are permissible, and that all of them contain nitrogen atoms in chain-linking positions. The simplest member of the group has $i=j=l$, and $k=l=m=0$, and of course corresponds to a simple amide link. Other permissible choices for L groups include hydrazides, acyl hydrazides, ureas, semi-carbazides, oxamides, etc., including also the thio and N-substituted analogs. However, at least about ¼ of the N atoms in all the L links should remain unsubstituted in order that the mechanical rigidity of the wet polymer be maintained at least up to about 40° C. Successive L groups along the polymer chain may be identical, or they may alternate between two or three choices in a regular pattern, or they may occur in a completely random pattern of many choices.

Polymers containing suitable L groups may be prepared by well known methods such as condensing dibasic acid chlorides with diamines (amide links), dibasic acids with dihydrazines (hydrazide links), dibasic acid chlorides with dicarboxylic dihydrazides (acyl hydrazide links), diisocyanates with dicarboxylic dihydrazides (semi-carbazide links), diisocyanates with diamines (urea links), etc. Alternatively, monomers of "mixed" functionality or a mixture of monomer types may also be employed to produce a regular or randomly varying sequence of L groups. Preferably, L is amide, acyl hydrazide, semi-carbazide, urea and mixtures thereof. More preferably, L is amide or hydrazide or mixtures of both.

Although the details of the molecular mechanism by which the polymers of the present invention achieve permselectivity are at present not fully understood, it has been discovered empirically that the presence of L groups of the above limited class provides a latent potential for a desirable combination of high water flux and low salt passage.

(B) The composition of the divalent organic radicals R appears to be much less critical than that of the L-groups. There are, however, several requirements which limit the choice of suitable structures for R: (1) the adjacent L-groups must be "activated" to exhibit their permselective capability, (2) the R components must not be allowed to become so large that the L-groups are "diluted" below an operable level, (3) the R groups must not permit the polymer to become too flexible, and (4) the R groups must not make the polymer too water-sensitive.

These requirements are not absolute limits for each individual R diradical, but rather are average limits on the R component of the polymer as a whole. Consequently, some individual diradicals may exceed the limits so long as the average value for all R radicals in the polymer remains within the stated ranges. Of course, successive R diradicals along the chain, like successive L-groups, may be identical, or they may alternate between two or three choices in a regular pattern, or they may occur in a completely random pattern of many choices.

Requirement (1), activation of the adjacent L-groups, represents a structural limitation on the terminal atoms in R, i.e., the points of attachment to the adjacent L's. As stated above, the presence of suitable L-groups provides only a potential permselectivity which may be fully developed only through "L-activation." This criterion must be fulfilled by the adjacent R diradicals. Even though the molecular mechanism by which "L-activation" is achieved is still not fully understood, it has been empirically discovered that activation occurs when the adjacent terminal atom in R is a carbon atom which is a member of an aromatic (either carbocyclic or heterocyclic) nucleus. Accordingly, at least about ½ of the terminal atoms bonded to L's which terminate in

groups must be aromatic carbon atoms, and at least about ⅔ of the terminal atoms bonded to L's which terminate in

groups must be aromatic carbon atoms, in order to provide sufficient activation to achieve the high level of permselectivity required of the polymers of this invention. These restrictions, of course, require that the polymers of this invention have at least a substantial aromatic content. The remaining terminal atoms in the R diradicals must also be carbon atoms (since hetero-atoms appear to lead to L-deactivation) which, however, may be members of non-aromatic structures. The most preferred polymers will have only R diradicals both of whose terminal atoms are aromatic carbon atoms.

Requirement (2), based on a dilution effect, sets a limit on the maximum size of the average R, expressed here in terms of $N_R$, which is equal to $N_R^0$, the number of atoms in R, exclusive of H atoms, corrected for the presence of any ionic or polar H-bonding groups. The absolute value of this size limit of course varies directly with the average "potency" of L. It appears that the potencies $s$ of the several choices for L vary approximately in direct proportion to the number of

units which they contain, and empirically $s$ is defined as equal to ½ [(number of

groups) +1] as a reasonable approximation. Accordingly, the R size limit can then be expressed by the term "$(\bar{N}_R)/(\bar{s})$ must be less than about 10", where $\bar{N}_R$ and $\bar{s}$ designate average values for the whole polymer. Thus, as an example, for a polymer whose successive L links alternate between amide ($s=1$) and acyl hydrazide ($s=1.5$), ($\bar{s}=1.25$) and $\bar{N}_R$ must therefore be less than about 12.5. For such a polymer, suitable choices for R might be, for example, a 50/50 mixture of p,p'-isopropylidenediphenyl ($N_R=15$) and m-phenylene ($N_R=6$) diradicals yielding an $\bar{N}_R=10.5$. The preferred polymers will have a $\bar{N}_R/\bar{s}$ less than about 7.

In computing $N_R$ for use in this "size limit" test, it has been found necessary to allow some "credit" for the presence of any hydrophilic groups in R. Thus, while these groups alone do not provide adequate permselectivity, their presence does permit the use of larger R's without diluting the L's below an effective concentration. Therefore, as indicated below in the definition of $N_R$, empirically a "credit" of 10 atoms is allowed for each ionic group in R, and a credit is allowed for the hydrogen-bonding contribution of the polar groups in R:

$$N_R = N_R{}^\circ - 10N_I - N_H$$

where:

$N_R{}^\circ$=number of atoms in R, exclusive of H-atoms)$\leq$50
$N_I$=number of ionic groups in R
$N_H$=number of H-bonding units for any polar groups in R.

Since the most commonly encountered ionic groups, e.g., sulfonate, carboxylate, phosphate, trimethylammonium, etc., comprise approximately 4 atoms, their presence "costs" nothing in $N_R$ and even allows them to "carry along" about 6 additional (carbon) atoms (the counter ion which is associated with the foregoing ionic groups is not critical. Representative such counter ions include the alkali and alkaline earth metal cations, chloride and sulfate anions). However, requirement (4), as discussed below, sets a limit on the number of such ionic groups which may be incorporated, so that R may not be increased in size indefinitely by this route. The $N_H$ credit for the hydrogen-bonding contribution of the polar groups in R is empirical in origin and is the product of the number of hydrogen-bonding groups $N_A$ and their hydrogen-bonding strength, $G_v$. In assigning values for hydrogen-bonding strength, Gordy and Stanford, J. Chem. Phys., vol. 9, p. 204 (1941) is followed using the shift of the IR OD stretching vibration which occurs when CH$_3$OD interacts with the individual polar groups as a quantitative measure of their hydrogen-bonding strength. For the purpose of this invention, observed shifts of from 30–90 cm.$^{-1}$ rate $2G_v$ units, shifts of 90–150 cm.$^{-1}$ rate $4G_v$ units, and shifts greater than 150 cm.$^{-1}$ rate $6G_v$ units.

The number of hydrogen-bonding groups $N_A$ in a polar group in R is the total number of oxygen and nitrogen atoms in the polar group reduced, for groups containing more than one oxygen or nitrogen atom, by one-half unit for each such atom attached to another atom by a double bond or for each such atom more than one of which is part of an aromatic ring, except that the sulfoxide group is credited with 2 hydrogen-bonding groups because of its strong hydrogen-bonding character. The $N_H$ credit for several polar groups is given in the following table:

| Polar group | $N_A$ | $G_v$ | $N_H$ |
| --- | --- | --- | --- |
| Ketone, aliphatic-aromatic ether, diaromatic ether | 1 | 2 | 2 |
| Dialiphatic ether | 1 | 4 | 4 |
| Amino, substituted amino, hydroxyl | 1 | 6 | 6 |
| Ester, sulfone, sulfoxide | 1.5 | 2 | 3 |
| Amide | 1.5 | 4 | 6 |
| Imidazole | 1.5 | 6 | 9 |
| Oxadiazole | 2 | 4 | 8 |

As an illustrative example, $N_R$ is calculated for the following hypothetical R diradical as follows:

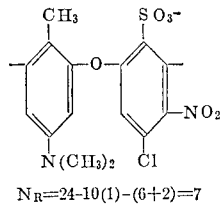

$N_R = 24 - 10(1) - (6+2) = 7$

Note that in determining $N_H$, the amine polar group contributes 6 units, the aromatic ether two units (and the chloro, nitro, and methyl groups contribute no units), and the ionic sulfonate is ignored, having been considered in the $N_I$ term.

To preclude unreasonably large R diradicals from passing the $N_R$ test, $N^\circ{}_R$ is arbitrarily restricted to a maximum value of 50, no mater how large the "credit" accumulated from any polar and ionic groups.

When the $N_H$ value of any pendent polar group in R is more than 4, the number of such pendent polar groups in the polymer preferably should not exceed one such group for every 300 molecular-weight units in the polymer. Examples of polar groups whose $N_H$ value is more than 4 include hydroxyl, amino, substituted amino and carboxamide.

Requirement (3), pertaining to polymer rigidity, is considered to be related to the need for mechanical form-stability of the permselective barrier under operating hydrostatic pressures. This requirement is particularly critical for asymmetric membranes of the dense skin/porous substrate variety where collapse of the substrate under pressure would deleteriously affect waterflux. Mechanically rigid membranes are obtained when mechanically rigid polymers are employed, and sufficient polymer rigidity is provided when the number of single-strand flexible links in the polymer chain is held below a critical concentration. A flexible link —M— is any atom in R linking the polymer chain solely through two single bonds. Examples of flexible links —M— to be considered are —CH$_2$—, —O—, and —S—, each of which appears to provide sufficiently low barriers to rotation about its single bonds to confer some flexibility to the polymer molecule. Of course, when these groups occur in "double-strand" chain links, e.g., 1,4-cyclohexylene, or 3,4-thiophenyl diradicals, they cannot contribute appreciably to chain flexibility, and are not to be counted. Similarly, occurrence of these groups in "non-chain" position, such as ethyl or methoxy pendent substituents, does not detract appreciably from polymer rigidity.

Empirically, it has been discovered that polymers will possess sufficient rigidity for the purpose of this invention when the number of single-strand, —M— links in the polymer chain is less than about ⅕, and preferably less than about ¹⁄₁₀, of the total number of atoms in the polymer, exclusive of H-atoms.

It will be obvious that requirements (1) and (3) may eminently be fulfilled by choosing aromatic diradicals for the R's. The preferred R units are divalent carbocyclic or heterocyclic aromatic groups represented by the symbol Ar, and divalent groups having the formula $$-Ar_1-Y-Ar_2-$$

in which $Ar_1$ and $Ar_2$ are each independently divalent monocyclic carbocyclic or heterocyclic aromatic groups; wherein Ar, $Ar_1$ and $Ar_2$ can each be substituted with up to two $C_1$–$C_3$ alkoxy, $C_1$–$C_3$ alkyl, amino, hydroxyl, $C_1$–$C_3$ mono- or di-alkyl amino, carboxamide, $C_1$–$C_3$ mono- or di-alkyl carboxamide, halogen (F, Cl, Br or I), sulfonate, carboxylate or $C_1$–$C_3$ trialkyl ammonium groups; and Y is —O—(oxygen); —S—(sulfur);

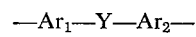

—SO$_2$—; —O—B—O—; —(O—B)$_2$O—;

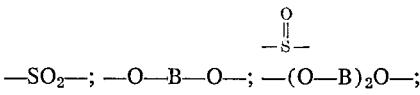

alkylene (straight or branched chain) of 1–4 carbon atoms; —NT—; or a five- or six-membered heterocyclic group having from 1–3 hetero-atoms selected from O, N or S; in which T above is H, alkyl of 1–6 carbons or phenyl and B above is alkylene (straight or branched chain) of 2–4 carbon atoms; with the proviso that the two linking bonds in all divalent aromatic groups are non-vicinal to one another or to any linking Y group.

Representative carboxylic or heterocyclic aromatic groups include those derived from benzene, naphthylene, pyridine, thiophene, pyrazine, furan, quinoline, benzimidazole, oxadiazole and the like.

Representative R units include

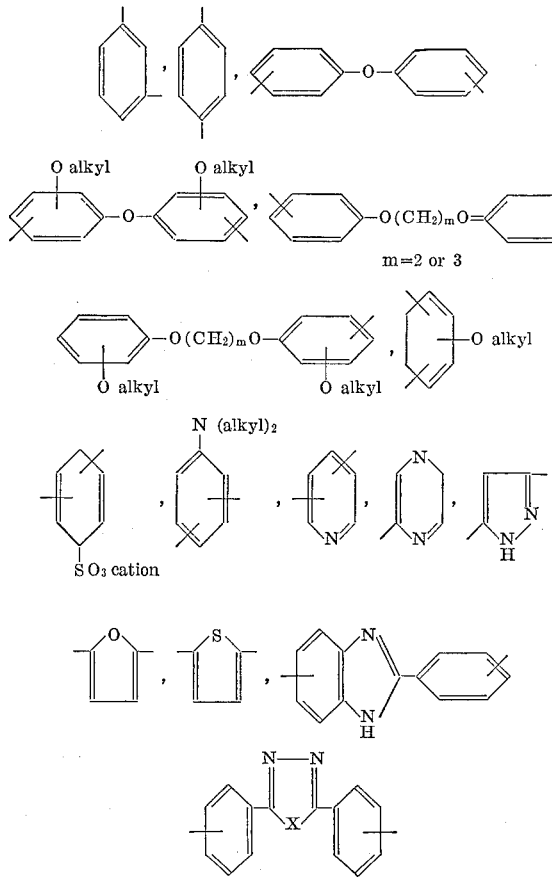

where X is O, S,

N alkyl, N phenyl, and mixtures of the above. Particularly preferred choices for R are m- and p-phenylene diradicals, or both. When both are present, the amount of m-phenylene is preferably greater than 50%. The preferred aromatic diradical choices for R are all inherently highly polarizable groups, as are the connecting L links. Accordingly, it has been discovered that the preferred polymers of this invention exhibit indices of refraction of 1.60 or greater, as determined by the Becke Line Method. The observed refractive index, in fact, shows an excellent positive linear correlation with a theoretical estimation of the stiffness of the isolated polymer molecules.

Requirement (4) concerns polymer hydrophilicity. A degree of hydrophilicity is clearly desirable for permselective barriers employed in aqueous desalination reverse osmosis, but it obviously must fall short of making the polymer water-soluble or even highly water-plasticizable. The most effective way of conferring additional hydrophilicity on polymers of the present invention is to incorporate some R groups bearing pendent ionic groups such as sulfonate, carboxylate, phosphate, ammonium, phosphonium, etc. However, we have discovered that introduction of such ionic groups increases not only the attainable water-flux as desired, but, unfortunately, simultaneously increases the salt passage as well, so that large improvements in permselectivity for osmotic desalination are not observed. Accordingly, a practical maximum limit on the acceptable concentration of ionic groups appears to be about 1 per 500 units of polymer molecular weight. Thus, for "base" permselective barrier polymers having exceptionally low salt passage, but inadequate water-flux, introduction of pendent ionic (P.I.) groups up to about 1 per 500 molecular weight may conveniently be employed to raise the water-flux, if an accompanying small increase in salt passage can be tolerated.

So long as requirements (1) through (4) are satisfied, the organic R diradicals may also contain either internal or pendent polar groups, such as ester, urethane, carbonate, phosphate, sulfoxide, sulfone, sulfonamide, etc. groups. An "internal" group may participate either as single or multistrand main chain bonding links or as a link between various R components, e.g., a pendent phenyl group.

(c) The polymers of this invention are employed as solid permselective barriers most often in the form of thin (supported) films or asymmetric membranes, and should therefore be of at least film-forming molecular weight. The subscript $n$ in the general formula consequently must be an integer large enough to represent a degree of polymerization sufficient that the polymer can be cast or pressed into a self-supporting film.

(d) The synthetic, organic, nitrogen-linked polymers of this invention must have a solubility of at least about 10% by weight in a medium consisting of 0–3% by weight of lithium chloride in a solvent selected from the group consisting of dimethylacetamide, dimethyl sulfoxide, N-methyl pyrrolidone, hexamethyl phosphoramide, and mixtures thereof at 25° C. Included within the scope of this solubility definition are polymers which, when dissolved to the extent of about 10% by heating in a specified solvent and then cooled to 25° C., remain in solution.

It is a surprising discovery that this solubility requirement is a critical restriction on the polymers operable in the present invention. Obviously, fabrication of the polymers into the permselective barrier form is facilitated if they are sufficiently soluble to form spinning or casting dopes; but the solubility test is apparently more fundamental than just a matter of fabrication convenience. For example, even though polymers "insoluble" by the present test may be fabricated into permselective barriers by other means, none has been found to exhibit comparable reverse osmotic desalination performance even though it may meet requirements (A), (B), and (C). It is therefore hypothesized that this solubility test may be rejecting those undesirable polymers having too high a degree of intermolecular interaction, which polymers may not be put into effective permselective barrier form due to their inherent strong tendency to form crystallites or other undesirable states of molecular aggregation. According to this theory, the high density individual molecular aggregates constitute undesirable low flux regions, while permeation through the decreased density regions left between such aggregates will tend to have reduced selectivity so that overall membrane permselectivity will be inferior.

Preferred polymers for the purpose of this invention are those with a randomized structure achieved by incorporating more than one variety of R and/or L groups in the polymer chain in an irregular sequence, in view of the tendency of such randomized polymers to be soluble and non-crystalline.

(2) Permselective barriers

As used herein, the term "permselective" has the usual denotation of the ability to preferentially permeate certain component(s) of a fluid mixture while simultaneously restraining other component(s). For the purposes of the present invention, which is primarily concerned with aqueous solution separations, a barrier is considered "permselective" when it exhibits both a water permeability $W_M$ of at least 350 and a solute passage of less than 20%. These parameters are more fully defined below in section 4. As used herein, the term "desalination" applies particularly to those permselective barriers and reverse osmotic processes wherein the solute to be preferentially rejected is a dissociated salt, e.g., NaCl, $Na_2SO_4$, $CaCl_2$, etc.

The polymeric permselective barriers of this invention may take many forms, e.g., thin coatings on porous substrates, thin films supported by porous substrates, thin-walled hollow fibers, etc. The porous substrates, in turn, may be shaped as tubes (supporting either internal or external barriers), flat plates, corrugated sheets, etc., all as known in the art.

A particularly preferred variety of permselective barrier especially useful for aqueous desalination applications is the asymmetric membrane, a monolithic structure which has a thin, relatively dense skin overlying a relatively porous substrate, although the transition from one region to the other may be more or less gradual and continuous. Since the porosities of interest occur on an extremely small scale, e.g., on the order of several angstroms up to several hundred angstroms, surface tension effects between the polymeric asymmetric membrane and fluid mixtures in contact therewith tend to be enormous so that efforts to dry the membranes normally produce significant distortions of the structure. Consequently, detailed structure studies of such membranes are difficult and frequently inconclusive. However, there is some evidence that the asymmetric membranes from polymers of this invention consist of columnar elements, roughly of the order of a hundred or so angstroms in diameter, whose distance of separation gradually decreases as the columns near the "dense skin" surface of the membrane. The surface, therefore, instead of being a continuous film of dense polymer, may be a mosaic of very closely spaced column-ends. The columns themselves appear to have very crudely a "string of beads" structure, the "beads" perhaps corresponding to balls of tangled polymer.

In any event, the asymmetric membrane structure, for purposes of this invention, may be identified by its performance in two dyeability tests. One test employs Crystal Violet dye to establish whether a sufficiently dense surface exists, and the other employs p-nitroaniline to establish whether a sufficient degree of porosity exists.

(a) The "Crystal Violet Surface Dyeability" test is performed as follows: The (wet) film to be tested is patted with paper tissue to remove surface water, and fixed between two female glass ball joints of about 3 cm. inside diameter. The surface of the film to be tested is immediately exposed to about 20 cc. of a 0.05% by weight solution of Crystal Violet dye, Colour Index No. 42,535, in chloroform, while the other side of the film is exposed to pure chloroform. Exposure is continued for 30 minutes. The dye solution is then removed, the cell is rinsed and refilled with fresh chloroform which is allowed to stand in contact with the film for an additional 30 minutes. The dyed portion of the film is then dried and dissolved in a mixture of 46 ml. of dimethylacetamide and 4 ml. of glacial acetic acid. The optical density of this solution in a 1 cm. cell is determined at 595 millimicrons, preferably with a Cary Model 15 spectrophotometer. The optical density correlates with the reverse osmosis salt passage of the membrane. This observation is consistent with the theory that salt rejection takes place in the dense surface layer of the membrane, and that a sufficiently dense surface will also be poorly dyed by Crystal Violet, i.e., exhibit low optical density less than 0.5 indicates a dense surface and samples having an optical density less than 0.1 are preferred. The most preferred membranes have a high asymmetry, i.e., the difference between optical densities on testing the two membrane surfaces will be more than 0.5 unit.

(b) By "p-nitroaniline dyeability" is meant the difference in optical densities between a test sample and a reference sample as determined in accordance with the following procedure: The film to be tested is cut into two strips 5 cm. x 2 cm. One strip is totally immersed in 20 ml. of a 0.6% by weight p-nitroaniline solution in methanol for a half hour at room temperature. After this immersion, the strip is removed from the dye solution and placed in 20 ml. of water for a half hour to remove any dye which is loosely held on the surface. The strip is next removed from the water, padded with paper tissues to remove surface water, and placed in a 50 ml. volumetric flask. The undyed sample strip is also placed in a 50 ml. volumetric flask. Dimethylacetamide is added to both the flasks to the 50 ml. mark. The contents of the flasks may be heated to 80° C. for up to an hour, if necessary, to get the films in solution. The optical densities of the two solutions are then measured at 384 millimicrons in a 1 cm. cell. The difference between the two optical density values is the "p-nitroaniline dyeability." It has been found that p-nitroaniline dyeabilities correlate with the reverse osmosis water permeability of the membranes. A p-nitroaniline dyeability of 0.7 corresponds to a water permeability of about 350 and a p-nitroaniline dyeability of about 0.98–1.0 corresponds to a water permeability of 600 or greater.

These dyeability tests may be performed on membranes in other than "flat film" form by employing samples with surface areas equivalent to those specified above.

(3) Asymmetric membrane preparation

The permselective barriers of this invention may be prepared in asymmetric membrane form by extracting a "protomembrane" consisting essentially of (a) about 25 to 80% by weight of polymer, based on the total solvent and polymer, dissolved in
(b) about 75 to 20% by weight of organic polar solvent, based on the total solvent and polymer,
(c) about 0 to 30% by volume of dissolved salt, based on the polymer, and
(d) about 0 to 25% of water, based on the weight of polymer, with a rinse medium which
   (a) is miscible with the organic solvent,
   (b) dissolves the salt,
   (c) is essentially chemically inert toward the polymer, and
   (d) is essentially a non-solvent for the polymer at about −20° to 50° C. for a time sufficient to extract about 75 to 100% of the solvent and about 75 to 100% of the salt.

The term "proto-membrane" is used herein to designate a shaped structure (e.g., film or hollow fiber) of the specified composition, which structure normally becomes substantially more rigid or "form-stable" upon being extracted. The polymer to be employed is one of the class of synthetic organic, nitrogen-linked polymers defined above in section (1). By "organic polar solvent" is meant any organic polar solvent or organic polar solvent mixture which dissolves the polymer, to the extent present in the proto-membrane, sufficiently that gross phase separation does not occur. Preferably the organic polar solvent is a water-miscible, dipolar aprotic solvent. By "water-miscible" is meant any solvent which is capable of mixing with water in all proportions without separation into two phases. By "dipolar aprotic" is meant any solvent which has a dielectric constant of greater than about 15 and, although it may contain hydrogen atoms, cannnot donate suitably labile hydrogen atoms to form strong hydrogen bonds with an appropriate species. Especially preferred water-miscible, dipolar aprotic, organic solvents include N,N-dimethylformamide, dimethyl sulfoxide, tetramethyl urea, N-methyl pyrrolidone, dimethylacetamide, tetramethylene sulfone, and hexamethyl phosphoramide.

The proto-membrane should contain about 20 to 75% of solvent, based on the weight of solvent and polymer, just prior to extraction. Permselective membranes prepared by extraction of membranes having solvent contents outside this range do not possess satisfactory water permeability and salt passage properties. For example, when the solvent content of the unextracted membrane is below about 20% based on the weight of solvent and polymer, the resulting membrane has an unsatisfactorily low water permeability. On the other hand, when the solvent content of the unexpected membrane is above about 75%, the resulting membrane has an unsatisfactorily high chloride salt passage. Similarly, the water content of the proto-membrane should range between 0 and 25%, based on the weight of the polymer.

The proto-membrane may contain up to about 30% by volume of soluble salt, based on the polymer, i.e., a salt which is soluble (and preferably highly dissociated) in the proto-membrane to the extent present and which is essentially chemically inert toward the polymer and the solvent. By "percent by volume of salt" is meant the salt volume percent (V) calculated using the equation $$V = \frac{W_s \times 100}{\left(\frac{W_p}{D_p} + \frac{W_s}{D_s}\right) D_s}$$

where:
$W_s$=weight percent of salt, based on anhydrous form,
$D_s$=density of salt, based on anhydrous form,
$W_p$=weight percent of polymer
$D_p$=density of polymer.

The densities of many suitable salts are listed, e.g., in the Handbook of Chemistry and Physics, published by The Chemical Rubber Publishing Co. Suitable salts include $LiCl$, $BiBr$, $LiNO_3$, $CaCl_2$, etc. Although the densities of individual polymers vary somewhat, an approximation of 1.31 grams per cc. may conveniently be used without substantial error for the polymers of this invention.

It is preferred, though not necessary, that some salt be present in the proto-membrane. The salt usually promotes solubility of the polymer in the solvent, and increases the water permeability of the final membrane in proportion to the volume percent of salt originally present. On the other hand, too much salt will cause an undesirable increase in the reverse osmosis salt passage of the final membrane. The maximum amount of salt which can be tolerated is about 30% by volume, based on the polymer. Of course, when the permselective barrier is intended for applications other than reverse osmosis aqueous desalination, the upper limits on salt and water content in the proto-membranes may often be beneficially exceeded.

It is understood that reference to "polymer" in this section includes mixtures of polymers.

Useful permselective asymmetric membranes are obtained by treating the proto-membrane with a rinse medium which is miscible with the solvent, is a solvent for the salt, is essentially chemically inert toward the polymer, and is essentially a nonsolvent for the polymer, thereby extracting most of the solvent and salt. Suitable rinse media include water, methanol, ethanol, and the like, and mixtures thereof. The preferred rinse medium is water.

The proto-membrane should be contacted with the rinse medium for a time sufficient to extract at least about 75% of the salt and at least about 75% of the solvent. Preferably, substantially all of these constituents are removed by the rinse medium. The temperature of the rinse medium may be varied from about −20° C., or below to about 50° C. Heating the membrane in the rinse medium at temperatures higher than about 50° C. has been found to be detrimental to the permeability qualities of the membrane.

For maximum efficiency as a permselective barrier, the extracted membrane preferably is continuously stored in contact with water. The permeation properties of the membrane usually deteriorate if it is allowed to become dry, although short exposure to air may not be injurious. Preferably, the final membranes have a water content of about 25 to 75% by weight.

The proto-membranes may be prepared either by casting a film or spinning a hollow fiber from a dope containing polymer, solvent, and optionally salt and/or water in the correct proportions for extraction, or by forming a membrane from dope containing too much solvent and partially drying the formed dope thereby evaporating solvent until the residual solvent content is within the designated range for unextracted membranes. Since the optimum solvent content for the unextracted membrane generally imparts to it a rather thick consistency, the dope is most conveniently formed with an excess of solvent present, and then partially dried to the correct proportion of solvent and polymer before extraction.

In preparing films, the dope can be filtered through a fine filter and poured onto a smooth surface such as a metal or glass plate, while carefully excluding dust and other foreign matter. The film can be spread or drawn to a thickness of about 2–40 mils (0.051–0.102 mm.) with a doctor knife. The film can be cast at temperatures of from about 10° to 150° C. The film, supported on the plate, may be partially dried to the desired composition. The plate and film are then immersed in water or other suitable rinse medium and the film is removed from the plate.

Hollow fibers of the same composition can be prepared by solution spinning methods using a suitable spinneret such as that taught by Burke and Hawkins in Belgian Pat. No. 704,360, granted Oct. 31, 1967. The spinning solution can be at a temperature of about 100° to 200° C., and preferably at about 100° to 140° C. This solution is extruded through the annular space in the spinneret and then passed into the rinse medium. When partial drying of the formed dope is desired, it may be passed from the spinneret into a drying zone containing a heated gas before passing into the rinse bath. The extruded dope in the form of a continuously hollow, thin-walled fiber is washed essentially free of solvent and salt in the rinse bath. The hollow fibers may be assembled for use in a permeator as described by Maxwell, Moore and Rego in U.S. Pat. 3,339,341.

(4) Permeation properties

The rate at which water passes through permselective barrier membranes is expresed herein either as "water permeability" ($W_m$), or "water flux" ($W_f$). "Water permeability" is defined as the number of gallons of water per day which pass through one thousand square feet of membrane at an effective reverse osmosis pressure of 1000 p.s.i.g. It may be calculated by the equation:

Water permeability=$W_m$
$$= \frac{\text{gallons of water permeate}}{\text{days} \times \text{sq. ft.} \times \text{pressure (p.s.i.g.)}} \times 10^6$$

The pressure used in this calculation is the effective reverse osmosis pressure, that is ($\Delta P - \Delta \pi$) where $\Delta P$ is the difference in hydraulic presures across the membrane, and $\Delta \pi$ is the difference in osmotic pressures across the membrane.

The square feet of membrane used in the water permeability calculation is based on the surface area of flat film exposed to feed water. In the case of hollow fibers, the surface area is the area of the outer fiber wall as expressed by the equation $$\text{square feet} = \pi D L$$

where D is the outside diameter of the hollow fiber in feet, and L is the length in feet of fiber exposed to the feed water. The related term "water flux" is defined by:

$$\text{water flux} = W_f = \frac{\text{gallons of water permeate}}{\text{days} \times \text{sq. ft.}}$$

It is stated in units of (g.f.d.)=gallons/sq. ft./day.

The rate at which solute is passed by a membrane is conveniently expressed in terms of percent solute passage:

Percent solute passage=percent $SP$
$$= \left(\frac{\text{Concentration of solute in permeate}}{\text{Concentration of solute in feed}}\right) \times 100$$

Frequently, the solute of most interest is dissolved salt, and the concentration of salt in the feed and the permeate may conveniently be determined conductometrically or by chemical analysis.

It is clear that the efficiency of a membrane, e.g., for desalination purposes, will increase as its water permeability increases and salt passage decreases, i.e., as its permselectivity increases. In general, the preferred permselective barriers of this invention will have water permeabilities of at least 350 and sodium chloride salt passages of less than 20%, and frequently will have water permeabilities of at least about 1000 (or water fluxes greater than 1 g.f.d.) and chloride salt passages of less than about 10%. The most preferred membranes of this invention readily achieve water permeability values in the neighborhood of 4,000 to 20,000 and higher, with chloride salt passage values of only 1% or less. The performance of such membranes may be further appreciated by considering that, when the feed is a 3.5% sodium chloride solution at a hydraulic pressure of 1500 p.s.i., $W_f$ is about 4.3 to 21.6 g.f.d. of 350 p.p.m. (or less) potable water (176–880 liters per square meter per day). Such permselective performance compares favorably with that of commercially available cellulose acetate membranes. Furthermore, long-term tests employing synthetic sea water feeds (ASTM Test D–1141 recipe) at 1000 p.s.i.g. indicate that whereas cellulose acetate membranes let salt through at ever-increasing rates with time (e.g., deleterious 50% increases in salt passage over periods of only 4 or 5 weeks), permselective barriers from polymers of this invention maintain their excellent low salt passage values substantially unchanged for periods of 3 to 6 months and longer.

The permselective barriers of this invention are further distinguished in that, although the molecular mechanism by which they achieve permselectivity is at present not fully understood, it appears to be substantially different from that which operates in cellulose acetate. For example, during reverse osmosis desalination experiments with synthetic sea water as the feed solution at conversions of roughly 10% (i.e., approximately 90% of the feed solution is by-passed around the membrane) and salt passages less than 5%, measurements of the pH of the permeate and by-passed feed have been performed. For membranes of the polymers of this invention, the permeate is consistently substantially more basic than the feed, while for cellulose acetate membranes, the permeate is consistently slightly more acidic than the feed. Similarly, for a 2000 p.p.m. NaCl feed (synthetic brackish water) the present membranes consistently show a basic shift of at least 2 pH units for the permeate vs. the feed, while cellulose acetate membranes show no significant pH change; and a qualitatively similar trend is also observed for 0.01 molar $CaCl_2$ feeds. It is apparent that the ion-rejecting mechanism of the present polymers is at least quantitatively different from that of cellulose acetate.

It has been estimated that economical hollow fiber devices for the purification of sea water can be prepared from membranes having water permeability values above about 350 and salt passage values of less than about 0.9% sodium chloride. Many of the membranes of this invention have permeation properties which greatly exceed these requirements for economical use in sea water purification. The membranes of this invention are even more efficient for the purification of brackish waters which commonly contain a relatively high concentration of sodium, calcium and magnesium sulfates. By adjusting the conditions of preparation, membranes having special properties can be prepared. Such membranes may exhibit extremely high water permeabilities while still excluding large molecules, which properties are useful, for instance, in purification of sugar solutions. On the other hand, by suitable adjustment of conditions, membranes of the invention can be prepared having moderately high water permeabilities and the ability to reject at least 99% sulfate and chloride salts.

Figure 2:
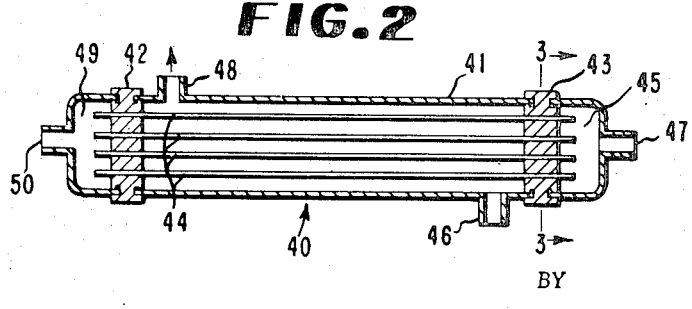
FIG. 2 is a diagrammatical elevation in section of a permation test cell useful for measuring the permeation properties of permselective barriers in hollow fiber form.

The permeation test cells of FIGS. 1 and 2 may be useful to determine the water permeabilities and salt passage rates of films and hollow fiber membranes, respectively. Referring now to FIG. 1, base section 11 and upper section 12 of permeation cell 10 are machined from blocks of corrosion resistant metal. Film 13, the reverse osmosis membrane, is a disc mounted on a layer of filter paper 14 against a stainless steel wire screen or mesh 15. When upper section 12 of the cell is bolted to lower section 11, synthetic elastomer O-rings 16 seat firmly around the periphery of the membrane and against the metal. Inlet 17 for feeding fluid into the cell is near the membrane. The fluid is agitated by a magnetically driven stirrer blade 18, positioned by support 19 and controlled by external and internal magnets 20 and 21 to ensure contact of fresh fluid with the membrane surface at all times. Bypass of a portion of the feed fluid is provided through exit 22. Fluid passing through membrane 13 is collected through a metal frit 23 into a small conductivity cell 25 where electrical connections 26 and 27 permit determination of salt content to be made by means of a conductivity bridge (not shown). From conductivity cell 25 the fluid passes into pipe 28 where its volume and flow rate are observed. Other test cells of similar design, which avoid the development of a stagnant layer of concentrated salt solution near the membrane, may also be used.

FIG. 2 shows a permeation test cell suitable for use with hollow fiber membranes. In permeation cell 40, casing 41 contains hollow fiber bundle 44 which is potted in end plugs 42 and 43. One end of bundle 44 extends through end plug 43 into collecting chamber 45 and the other through plug 42 into chamber 49. Fluid is fed into cell 40 through feed inlet 46, permeates through the walls of the fibers, passes through the hollow interior thereof into collection chambers 45 and 49 and is withdrawn through exit 47 and 50. Excess fluid not permeated is withdrawn through casing exit 48.

An epoxy resin suitable for potting the ends of bundle 44 thereby forming plugs 42 and 43 can be prepared by mixing 100 grams of an epoxy polymer modified with butyl glycidyl ether ("ERL 2795," Smooth-On Manufacturing), 16 grams of a modified aliphatic amine adduct "Sonite 15," Smooth-On Manufacturing Company), and 20 grams of triphenyl phosphite ("Mod-Epox," Monstanto). The resin is cast around the fiber ends in a suitable mold immediately after mixing and the resin is allowed to set up by storing at room temperature for 16 to 24 hours.

Figures 3, 4:
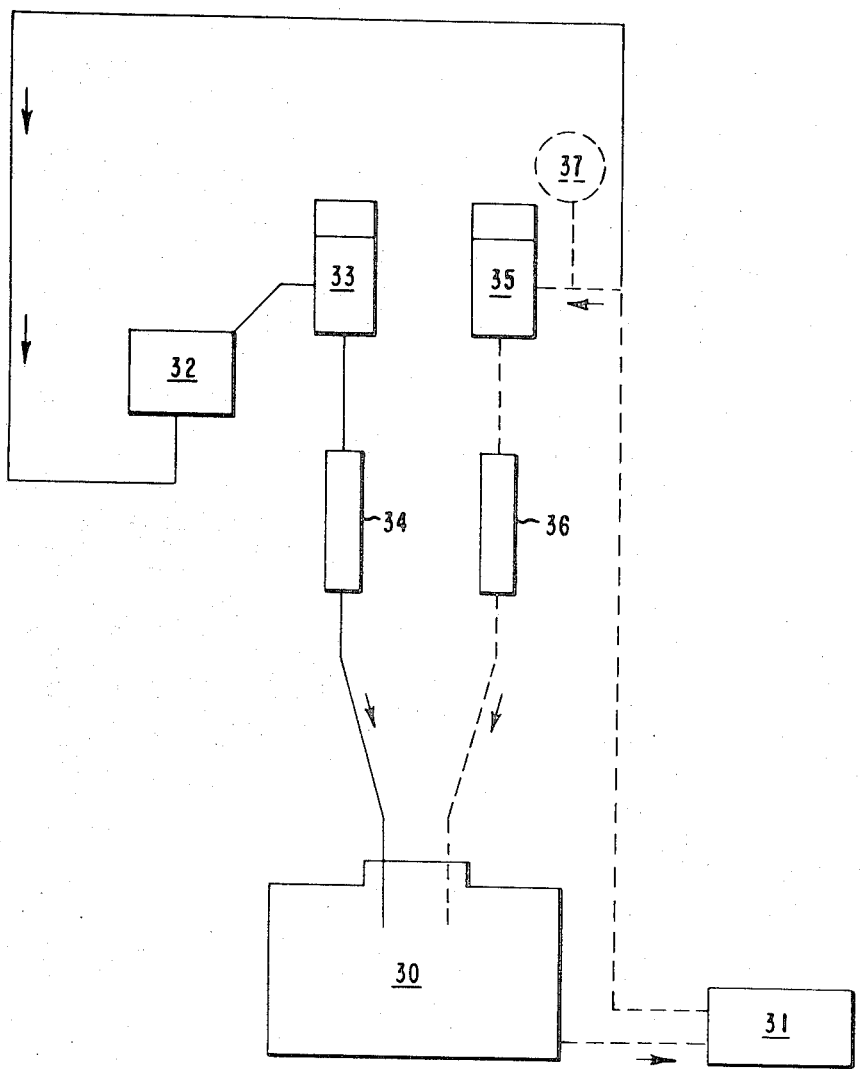
FIG. 3 is a diagrammatic section along line 3—3 of a cell of the type of FIG. 2.
FIG. 4 is a schematic diagram of a pumping and control system used with the permeation test cells of FIGS. 1 and 2.

FIG. 3 illustrates a section through plug 43 of a cell similar to that of FIG. 2, and shows the hollow ends of individual fiber 51 (not to scale) extending through plug 43 mounted in casing 41. It will be understood that bundle 44 may actually contain millions of fibers.

FIG. 4 shows a pumping system for providing circulation of feed fluid and maintenance of pressure inside the permeation cell during water permeability and salt rejection determinations. Fluid is circulated from reservoir 30 by pump 31 through permeation cell 32, which may be the cell of either FIG. 1 or FIG. 2, pressure regulator 33, flow meter 34 and back to reservoir 30. Temperature is controlled as desired by placing the cell and permeate measuring equipment in an air bath (not shown) monitored by a thermocouple (also not shown) mounted adjacent to the test film inside the cell. Alternatively, the cell may be placed in a water bath. Regulator 35 and flow meter 36 permit excess fluid from pump 31 to by-pass permeation cell 32 and return to the reservoir. Pressure is monitored by gauge 37. Conventional piping is, of course, supplied to connect the units of the control system as indicated.

In general, permeators for separating fluid mixtures comprise, in combination, a fluid tight housing defining an enclosed fluid separation zone, at least one permselective membrane in said housing, support means cooperating with said housing and each said membrane to support said membrane in operative relationship in said separation zone, inlet means cooperating with said housing for directing a feed fluid at a given pressure against one surface of said membrane, and exit means cooperating with said housing for collecting and removing a permeated fluid at a lower pressure from another surface of said membrane.

A preferred form of permeator is shown in FIGS. 5 to 8. Referring now to FIG. 5, permeator 100 comprises an elongated fluid-tight tubular casing asembly 101 formed of a suitable material such as steel. Both ends of tubular casing assembly 101 are provided with flange elements 102 and outwardly tapered portions 107. In addition the tubular casing assembly is provided with conduit means 108 to provide for movement of fluid out of the assembly. Preferably, means 108 communicates with the enlarged interior portion of the tubular assembly formed by tapered portions 107. Optionally, the casing assembly is also provided with conduit means 109 through which a sweep fluid may be introduced, if desired.

A plurality of very small hollow fibers 111 of this invention are positioned inside the tubular casing assembly 101 in a relatively close-packed relationship. As shown in FIGS. 6–8, the plurality of fibers 111 comprises a number of substantially equal fiber groups 110. Each group may be firmly peripherally constrained by an elongated flexible porous sleeve member 112 extending longitudinally of the fibers and the groups. In addition, the fiber groups 110 each surrounded by their porous sleeve members 112 may all be surrounded by at least one overall elongated flexible porous sleeve member 113 as shown. The detailed construction and functioning of these sleeve members is fully discussed by Maxwell et al. in U.S. Pat. 3,339,341.

As shown in FIG. 6, the sleeve-encased fiber groups 110 positioned in the main portion of the tubular casing assembly between the tapered portions 107 are relatively closely packed. The fiber groups and the fibers themselves engage each other, and the casing assembly, laterally in a number of elongated areas or lines extending along the length of the groups and fibers (FIGS. 6 and 7). These elongated areas define between the groups, between the fibers, and between the groups and the interior of the casing assembly, a plurality of transversely evenly distributed elongated passageways extending along the length of the fibers and the tubular casing assembly. These passageways have very little lateral communication, and force circulation of fluid in the casing assembly and outside the hollow fibers to move substantially longitudinally along the fibers and the interior portion of the tubular casing assembly between the tapered portions 107.

A positional relationship of the fiber groups adjacent their ends and resulting from the tapered portion 107 of the tubular casing assembly is shown in FIG. 8. It will be seen in this figure that the enlarged interior cross-section at the tapered portion 107 reduces the packing density of the fiber groups and increases the spacing between them to permit improved collection of fluid at outlet means 108.

Each end of the tubular casing asembly 101 is closed by a fluid-tight cast wall member 114 preferably formed of polymeric composition such as an epoxy resin. The hollow fibers, substantially parallel to each other and to the axis of the tubular casing assembly, extend between the cast wall members 114. The hollow fibers have open end portions which are embedded in and extend through the cast wall members in fluid-tight relation thereto. The tubular casing assembly 101 is further provided at each end with outer closure members 103 which cooperate with the tubular casing asembly 101 and the cast wall members 114 to define a closed chamber 115 in communication with the interior portions of the hollow fibers. Each chamber 115 is provided with conduit means 104 to permit movement of fluid between each chamber and a point outside the chamber. The outer closure members 103 are provided with flanges 105 which are secured to the flanges 102 of the tubular casing assembly by means of bolts 106. The outer closure members 103 are formed of a suitable material such as steel.

The interior tapered end portion 107 of each end of the tubular casing assembly 101 cooperates with the corresponding tapered portion of the cast wall member 114 to develop a wedging action to help maintain the fluid-tight seal between these parts. A similar action occurs as a result of the engagement between the engaged tapered portions of outer closure member 103 and the cast wall member 114. In the embodiment shown, an annular resilient gasket 116 of suitable material such as rubber or neoprene is provided between the cast wall member 114 and the tubular casing assembly 101 and between the cast wall members and outer closure members 103 to improve the fluid-tight sealing action.

The inner faces 117 of the cast wall members 114 are relatively smooth, continuous, even and substantially free of sharp deviations in the directions along which the hollow fibers extend. Achievement and maintenance of this configuration provides a fluid-tight seal around the hollow fibers without diminishing the effective surface area of the fibers between the cast wall members. In the embodiment shown, the inner surface 117 of the cast wall members 114 has a concave curved configuration. This configuration results from the centrifugal casting operation preferably employed to form the cast wall member 114 as described in detail by Maxwell et al. in U.S. Pat. 3,339,341.

Although the embodiment illustrated in FIG. 5 shows feed fluid entering one conduit means 104, effluent exiting the opposite conduit means 104, and permeate product exiting conduit means 108, the fluids could be passed in the opposite direction. In this latter embodiment, the feed fluid enters the permeator via conduit 109, effluent exits conduit 108, and permeate product exits conduit means 104 at either or both ends of the permeator.

A particularly preferred form of permeator is illustrated in FIG. 9. Referring now to FIG. 9, steel shell 60 containing feed port 61, exit 62 and flanges 63 is packed tightly with U-shaped bundles of hollow fibers 64. All open ends 65 of the fibers exit through a single pressure tight epoxy cast end member 66 which is in pressure tight relationship with steel shell 60 and end closure 67 containing flanges 68. When flanges 63 and 68 are bolted together with bolts 69, cast end member 66 is effectively sealed by gasket seal 70 and Or-ing seal 71.

Feed fluid is pumped into feed port 61 under pressure. As the fluid passes over the outer surface of the hollow fibers, certain components of the fluid pass more readily through the walls of the hollow fibers than others. The fluid inside the hollow fibers, now enriched in those components which pass through the fiber walls most easily, and impoverished in the components which pass through the fiber walls less easily, exits from the open ends 65 of the hollow fibers, thence passing through the valved (not shown) exit at 72. Meanwhile, the fluid components rejected by the hollow fiber walls pass out of steel shell 60 at 62, restricted by a pressure valve (not shown).

In a preferred permeator embodiment of FIG. 9, the hollow fiber bundle is spaced away from the inside walls of the shell forming an annular space or ring to permit the feed fluid to surround the fiber bundle. Additionally, a perforated tube can be inserted at outlet port 62 in order to create uniform flow of the feed fluid across the fiber bundle before exiting through the perforations of the tube, down the tube and out outlet 62.

Permselective membranes or barriers in thin film form are taught by Loeb and Sourirajan in U.S. Pat. 3,133,132 and by Loeb, Sourirajan and Weaver in U.S. Pat. 3,133,137. Permselective membranes or barriers in the form of hollow fibers are described by Majon in U.S. Pats. 3,228,876 and 3,228,877, and by Maxwell et al. in U.S. Pat. 3,339,341.

Generally, the permselective membranes of this invention have a thickness of about 2–380 microns and more commonly about 5–180 microns. When the membrane is in the form of a film, it generally has a thickness of about 10–380 microns and preferably about 50–180 microns.

The hollow fiber permselective membranes of this invention generally have outside diameters of about 15–250 microns and wall thicknesses of about 2–75 microns. Preferably, they have outside diameters of about 20–150 microns and wall thicknesses of about 5–40 microns. In general, the fibers with smaller outside diameters should have thinner walls so that the ratio of the cross-sectional area of the internal bore of the fiber to the total cross-sectional area within the outer perimeter of the fiber is about 0.12–0.60, that is, about 0.12:1 to 0.60:1. Preferably the ratio is about 0.18–0.45. Hollow fibers of the preferred size may be obtained with spinnerets having plate hole diameters near 30 mils and insert diameters near 22 mils.

(5) Examples

The following examples illustrate the improved permselective barriers of this invention, and are given without any intention that the invention be limited thereto. All parts and percentages are by weight except where otherwise specified. All polymerization reactions were carried out in solution, usually cooled below room temperature, employing standard preparation techniques, e.g. as described in U.S. Pats. 3,094,511 (polyamides), 3,130,182 (polyacyl hydrazides), 3,004,945 (polysemicarbazides), 2,888,438 (polyureas), etc.

EXAMPLE 1

Permselective barriers in the form of asymmetric membranes were prepared by the following procedure. A series of casting dopes were prepared employing the ingredients indicated in Table 1A by stirring the mixture until a clear solution was obtained. The solution was filtered through a "Millipore" pressure filter fitted with a "Flotronics" silver membrane of $5\mu$ or smaller, e.g., $0.45\mu$, pore size, and subsequently poured onto a plate glass support and drawn to a film of the specified thickness employing an appropriate doctor knife. The dope film, on its glass support, was partially dried by placing the glass support on a hot plate at the specified temperature for the specified time in a current of ambient temperature air (except as noted) to form a protomembrane. The plate glass/protomembrane was allowed to cool for a brief time and then immersed in stirred ice water to extract the residual salt and solvent. The resulting asymmetric membranes were stored under water until being tested in a cell similar to that of FIG. 1. The membranes were oriented with the dense surface in contact with the designated feed solution at the indicated pressure and temperature, with approximately 90% bypass flow. The reverse osmosis permeation tests were usually run at least about two days before the results reported in Table 1B were determined, so that any deceptive start-up transients in flux or salt passage did not influence the data.

TABLE 1A.—ASYMMETRIC MEMBRANE PREPARATION

| Polymer* | Solvent**, solvent/polymer | Salt | Casting Thickness, mils | Temperature °C./time, minutes*** |
|---|---|---|---|---|
| A | DMAc, 85 parts/15 parts | $CaBr_2 \cdot 2H_2O$, 4.5 parts | 15 | 110/15 (V) |
| B | DMSO, 100 ml./10 grams | LiCl, 1.0 gram | 40 | 90/90 (V) |
| C | DMSO, 20 ml./2 grams | LiCl, 0.2 gram | [1] 25 | 100/15 |
| D | DMSO, 90 parts/10 parts |  | [2] 35 | 80/60+160/5 |
| E | DMAc, 33.4 parts/10 parts | LiCl, 1.5 parts | 15 | 60/60 (V) |
| F | DMSO, 9 ml./1 gram | LiCl, 0.03 gram | --- | 80/360 |
| G | DMAc, 85 parts/15 parts | $LiNO_3$, 4.5 parts | 25 | 105/5 |
| H | do | do | 25 | 106/5 |
| I | do | $LiNO_3$, 3 parts | 25 | 100/5 |
| J | do | $LiNO_3$, 4.8 parts | 25 | 103/5 |
| K | DMAc, 82 parts/18 parts | $LiNO_3$, 3.6 parts | 15 | 80/15 |
| L | DAMc, 85 parts/15 parts | $LiNO_3$, 4.8 parts | 25 | 105/17 |
| M | do | do | 25 | 95/9 |
| N | do | $LiNO_3$, 4.5 parts | 25 | 102/5 |
| O | do | $LiNO_3$, 7.5 parts | 25 | 106/4 |
| P | do | $LiNO_3$, 6.8 parts | 25 | 90/14 |
| Q | DMSO, 85 parts/15 parts | do | 25 | 95/10 |
| R | DMAc, 85 parts/15 parts | $LiNO_3$, 4.8 parts | 25 | 80/10 |
| S | DMAc, 87.2 parts/12.8 parts | $LiNO_3$, 3.1 parts[4]; LiCl, 0.75 parts | 15 | 100/5 |
| T | DMSO, 85 parts/15 parts | $LiNO_3$, 4.5 parts; LiCl, 0.75 parts | 15 | 100/15 |
| U | do | $LiNO_3$, 1.5 parts; LiCl, 0.75 parts | 15 | [5] 100/10 |
| V | DMAc, 80 parts/27 parts | $LiNO_3$, 6 parts | 15 | [6] 95/5 |
| W | DMAc, 85 parts/15 parts | $LiNO_3$, 4.5 parts | 15 | 100/5 |
| X | do | $LiNO_3$, 4.8 parts | 25 | 102/5 |
| Y | do | $LiNO_3$, 4.5 parts | 15 | [5] 95/10 |
| Z | do | LiCl, 1.5 parts | 15 | 80/10 |
| AA | do | $LiNO_3$, 4.8 parts | 25 | 105/25 |
| BB | DMAc, 90 parts/10 parts | $LiNO_3$, 2 parts | 20 | [6] 95/5 |

[1] Cast on "Iconel" plate, not cooled before rinsing.
[2] Cast on chrome-plated metal plate.
[3] Also contains 0.9 parts triethanolamine.
[4] Also contains 0.26 parts triethanolamine.
[5] Rinse water at 25° C.
[6] Also contains 0.5 parts triethanolamine.

NOTE:
*See Table 1C.
**Solvent Identification: DMAc=N,N-dimethylacetamide; DMSO=Dimethyl sulfoxide.
***(V) indicates drying occurs in vacuum oven at reduced pressure, rather than on hot plate.

TABLE 1B.—PERMSELECTIVE DATA

| | L, mole percents | $\overline{N}_{R^a}$ | $f_M$ | P.I. | Index of refraction | Reverse osmosis feed | $W_M/W_f$ | Percent Cl⁻ passage |
|---|---|---|---|---|---|---|---|---|
| Polymer:* | | | | | | | | |
| A | —CONH— (100%) | 6.0 | 0 | 0 | 1.688 | NaCl¹ | 6,050/7.0 | 0.5 |
| B | —CONHNHCO— (100%) | 4.0 | 0 | 0 | 1.652 | SW² | 3,450/2.4 | 10 |
| C | Same as above | 2.3 | 0 | 0 | | SW² | 18/500, 12.2 | 3 |
| D | do | 3.3 | 0.18 | 0 | 1.599 | NaCl | 700/0.5 | 1.8 |
| E | —NHCONHNHCO— (100%) | 6.3 | 0.03 | 0 | | SW | 4,600/3.0 | 3 |
| F | —CONHNHCOCONHNHCO— (100%) | 2.4 | 0 | 0 | | SW | 1,160/0.8 | 7.3 |
| G | —CONHNHCO—(50%); —CONH—(50%) | 4.8 | 0 | 0 | 1.674 | SW | 24,000/15.7 | 1.5 |
| H | Same as above | 4.8 | 0 | 0 | | SW | 15,300/10.0 | 1.0 |
| I | —CONHNHCO—(75%); —CONH—(25%) | 4.4 | 0 | 0 | 1.651 | SW | 9,200/6.0 | 0.7 |
| J | —CONHCO—(50%); —CONCH₃—(25%) —CONH—(25%) | 4.8 | 0 | 0 | 1.654 | SW | 24,000/15.8 | 3.2 |
| K | —CONH—(50%); —CONCH₃—(50%) | 6.0 | 0 | 0 | 1.656 | SW | 6,860/4.9 | 20 |
| L | —CONHNHCO—(50%); —CONH—(29.4%); —NHCO-CONHNHCO—(20.6%) | 4.1 | 0 | 0 | 1.658 | SW | 17,100/11.4 | 5 |
| M | —CONHNHCO— (100%) | 3.1 | 0.05 | 0 | 1.646 | SW | 25,900/17.1 | 3 |
| N | —CONHNHCO— (100%) | 2.9 | 0.057 | 0 | 1.664 | SW | 17,200/11.3 | 1.4 |
| O | Same as above | 4.7 | 0.07 | 0 | 1.662 | SW | 18,000/12.0 | 0.5 |
| P | —CONHNHCO—(50%); —CONHNCH₃CO—(50%) | 5.0 | 0.07 | 0 | 1.654 | SW | 20,200/13.1 | 0.7 |
| Q | —CONHNHCO— (100%) | 5.0 | 0 | 0 | 1.569 | SW | 20,600/14.4 | 14.3 |
| R | Same as above | 5.0 | 0 | 0 | 1.662 | SW | 12,500/8.3 | 9 |
| S | —CONHNHCO—(33%); —CONHNHCONH—(67%) | 6.0 | 0.11 | 0 | | SW | 10,400/6.7 | 0.9 |
| T | —NHCONH— (100%) | 6.0 | 0 | 0 | 1.685 | SW | 5,400/3.6 | 4.4 |
| U | Same as above | 5.8 | 0 | 1/2,766 | | SW | 8,670/5.8 | 6.3 |
| V | —CONH— (100%) | 5.7 | 0 | 1/2,169 | 1.678 | SW | 16,800/11.9 | 1.5 |
| W | Same as above | 6.1 | 0.005 | 1/5,043 | | SW | 7,150/4.7 | 2 |
| X | —CONHNHCO—(56%); —CONH—(44%) | 4.7 | 0.077 | 1/922 | 1.650 | SW | 13,200/9.1 | 2.6 |
| Y | —CONH— (70%); —CSNH— (30%) | 6.0 | 0 | 0 | 1.666 | SW | 5,090/3.4 | 5.5 |
| Z | —CONH— (100%) | 8.0 | 0 | 0 | | SW | 1,690/1.1 | 0.7 |
| AA | Same as above | 6.0 | 0 | 0 | 1.738 | SW | 9,000/5.9 | 0.5 |
| BB | do | 7.5 | 0 | 0 | 1.680 | SW | 7,640/5.0 | 1.1 |

¹ 3.5% NaCl solution at 1,500 p.s.i.g. and 30° C.
² Synthetic sea water (ASTM 1141) at 1,000 p.s.i.g. and 25° C.
NOTE.—*See Table 1C.

TABLE 1C

Polymer Identification: $-(R_1L_1R_2L_2)-$

Percents are mol percent

| | R₁ | L₁ | R₂ | L₂ |
|---|---|---|---|---|
| Polymer: | | | | |
| A | ⌬ (phenylene) | —N(H)—C(=O)— | ⌬ (70%) / —⌬— (30%) | —C(=O)—N(H)— |
| B | Same as above | —C(=O)—N(H)—N(H)—C(=O)— | ⌬ | —C(=O)—N(H)—N(H)—C(=O)— |
| C | do | Same as above | ⌬—NH₂ | Same as above. |
| D | do | do | —(CH₂)₄— | Do. |
| E | —⌬—CH₂—⌬— | —N(H)—C(=O)—N(H)—N(H)—C(=O)— | ⌬ | —C(=O)—N(H)—N(H)—C(=O)—N(H)— |
| F | ⌬ | —C(=O)—N(H)—N(H)—C(=O)—C(=O)—N(H)—N(H)—C(=O)— | | |
| G | ⌬ (80%) / —⌬— (20%) | —C(=O)—N(H)—N(H)—C(=O)— | ⌬ | —C(=O)—N(H)— |
| H | ⌬ (83%) / —⌬— (17%) | Same as above | ⌬ (70%) / —⌬— (30%) | Same as above. |

See footnotes at end of table.

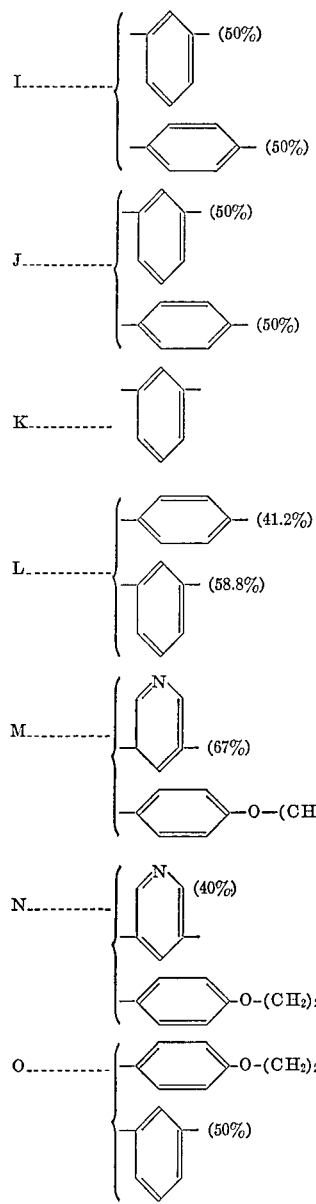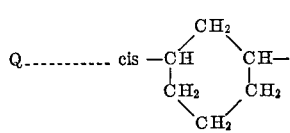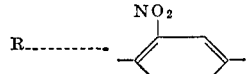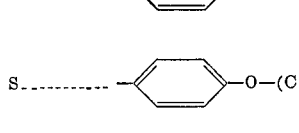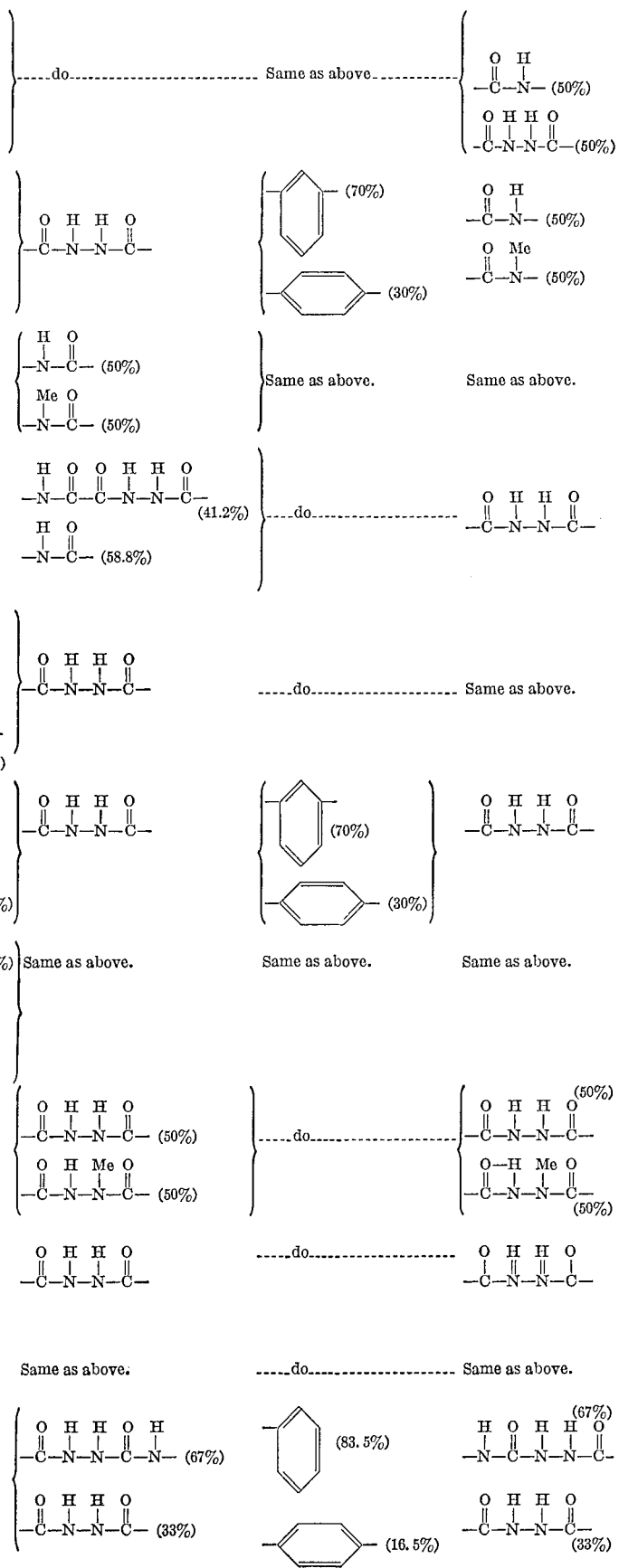
See footnotes at end of table.

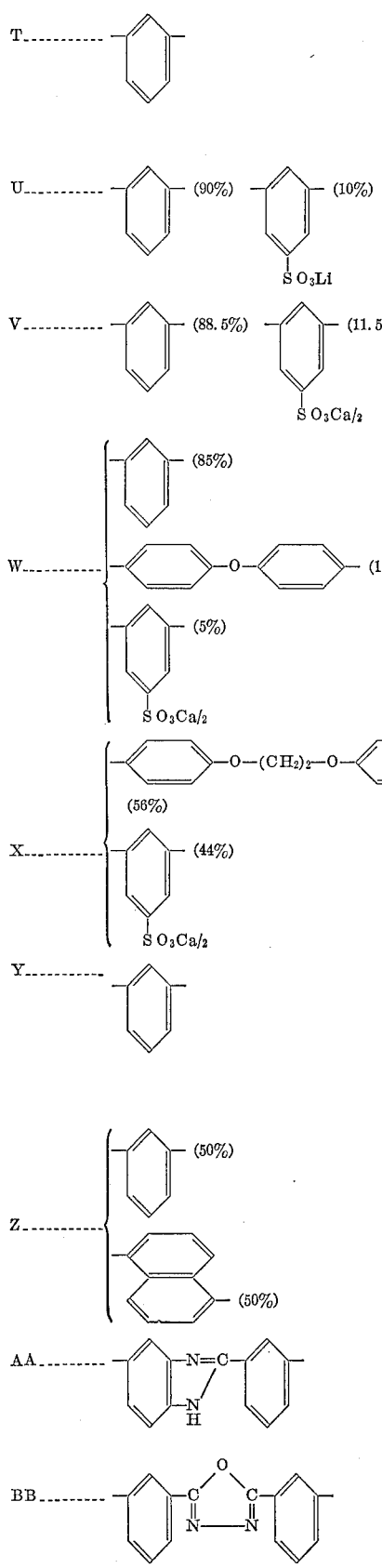
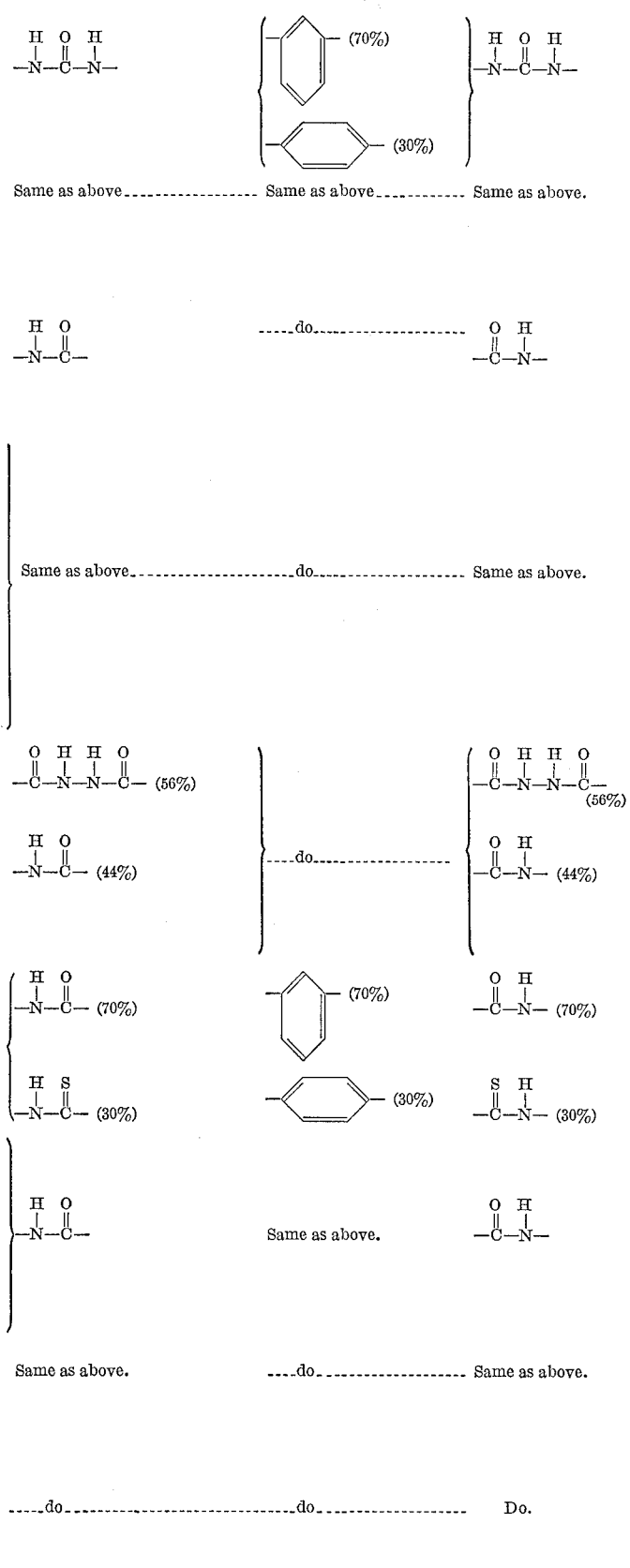

NOTE.—"Me" in this Table 1C represents a —CH₃ group.

EXAMPLE II

This example illustrates the preparation of permselective barriers of several polymers in hollow fiber form.

A dilute solution of polymer of Example 1–A composition in dimethylacetamide containing lithium chloride and ammonium chloride was stirred and concentrated at 90–115° C. by surface evaporation of the solvent in a stream of nitrogen to yield a solution of composition 59.7% dimethylacetamide, 37.8% polymer, 2.3% lithium chloride, and 0.2% ammonium chloride. The inherent viscosity of the polymer was 1.18 (0.5 g. polymer/100 cc. dimethylacetamide containing 4% lithium chloride at 25° C.). Hollow fibers were spun by extruding the above solution at 125° C. through an annular 5-hole spinneret of the type described in U.S. 3,397,427. The fibers passed through a 12′ x 6″ cell maintained at 150° C. supplied with inert aspiration drying gas at 135° C. The partially dried fibers emerging from the cell were quenched in cold water and piddled at 125 yd./minute into a container with continuous water spraying.

After extraction with water, a skein of 80 hollow fibers, having an average O.D. of 70$\mu$ and an average I.D. of 43$\mu$ (37% hollow), was inserted, wet, into a small permeation device similar to that illustrated in FIG. 2. The fiber ends were dried, potted in epoxy resin, and carefully cut to preserve openness. Permeate exit 50 of the permeation cell was closed with a pressure gauge so that all permeate was withdrawn from exit 47.

The permeation tests were carried out using a sodium chloride solution containing 2000 parts per million of chloride ion at an applied pressure of 600 p.s.i.g. The pressure gauge at the permeate exit indicated zero "dead end" tube pressure. The water flux was 0.24 g.f.d. and the chloride passage was 1.6%.

In a similar experiment, hollow fiber permselective barriers were spun from a mixed polyamide polymer prepared from 2.04 parts of meta-phenylenediamine, 0.287 part of orthophenylenediamine, 0.0725 part of paraphenylenediamine and 0.152 part of methaphenylenediamine-4-sulfonic acid calcium salt reacted with about 4.7 parts of a 70/30 mixture of isophthaloyl/terephthaloyl chloride.

A solution was prepared containing 38.4% of the above polymer, 1.0% of water and 60.6% of dimethylacetamide by stirring the mixture at 80–120° C. A sample of polymer isolated from this solution had an inherent viscosity of 1.13. Spinning was accomplished as before, except that the aspiration gas was at 138° C., and the partially dried fibers were quenched in cold water and taken up on a bobbin of 188 yd./min. under a water spray.

After aqueous extraction, a skein of 80 hollow fibers, having an average O.D. of 56$\mu$ and an average I.D. of 28$\mu$ (25% hollow) was tested as above.

At 600 p.s.i.g. applied pressure, the gauge at the permeate exit registered 30 p.s.i.g. The water flux was 0.32 g.f.d. and the chloride passage was less than 1.5%.

In a third experiment, a hollow fiber permselective barrier was spun from a polymer prepared from 30.22 parts of m-aminobenzhydrazide and 6.044 parts of p-aminobenzhydrazide reacted with 48.725 parts of a mixture comprised of 70% isophthaloyl chloride and 30% terephthaloyl chloride. The inherent viscosity of the polymer was 0.8 (0.5 g. polymer/100 cc. dimethylacetamide at 25° C.). A solution was prepared containing 61.1% dimethylacetamide, 35.4% polymer and 3.5% lithium nitrate by stirring the mixture at 90–110° C. Hollow fibers were spun as in part 1 of this example. The partially dried fibers were quenched in cold water and taken up on a bobbin at 100 yd./min. under a water spray.

After aqueous extraction, a skein of 80 hollow fibers, having an average O.D. of 62$\mu$ and an average I.D. of 31$\mu$ (25% hollow) was tested as above.

At 600 p.s.i.g. applied pressure, the gauge at the permeate exit registered 85 p.s.i.g. The water flux was 0.89 g.f.d. and the chloride passage was 9%.

EXAMPLE III

This example illustrates preparation of a thin film permselective barrier employed over a porous support.

A 2% solution in dimethylformamide of the polyamide/ acyl hydrazide obtained on reacting an 80/20 mixture of 1,3-aminobenzhydrazide/1,4 - aminobenzhydrazide with a 70/30 mixture of isophthaloyl/terphthaloyl chlorides was heated to its boiling point. A 3 x 5″ clean glass plate, previously dried at 150° C., was lowered edge-first into the hot solution, and then withdrawn after 5 minutes. The glass plate was allowed to cool about 1 minute, and then the adhering polymer film was rinsed in tap water. The film was next removed from the plate and floated on the surface of the water from which it was picked up on a porous support comprising the dull side of a commercial cellulose acetate (millipore) membrane having 100 A. sized pores.

This permselective barrier on its porous support was tested in an apparatus similar to that of FIG. 1 for its reverse osmosis desalination performance. Using a synthetic sea water feed at 1000 p.s.i.g. pressure and 25° C., a water flux of 0.86 g.f.d. and a chloride passage of 7% were observed.

EXAMPLE IV

This example illustrates preparation of a perm-selective barrier having high water flux, and low solute passage for a dissolved polysaccharide.

A casting dope was prepared containing 11 parts of polymetaphenylene isophthalamide and 5 parts calcium chloride dissolved in 89 parts of dimethylacetmide. A film was cast on plate glass employing a 15 mil doctor knife. The cast film was dried for 10 minutes on a hot plate at 80° C. in a current of ambient temperature air, and then rinsed and extracted in stirred room temperature water to produce a permselective barrier which was tested in an apparatus similar to that of FIG. 1.

In a reverse osmosis test with an aqueous feed solution of Dextran-20 (a water soluble polysaccharide having a weight average molecular weight of 21,800 and number average molecular weight of 14,500, available from Pharmacia Fine Chemicals, Inc., Sweden) at a concentration of 2 g. per liter and pressure of 400 p.s.i.g. at 25° C., a water flux of 7.8 g.f.d. and solute passage of 1.1% was observed after two days operation. The same barrier film passes 55% dissolved glucose from a 0.025 molar feed solution, and 88% chloride from a 2000 p.p.m. NaCl feed, all at 400 p.s.i.g. pressure.

Aromatic polyamides useful in preparing the barriers or membranes of this invention may themselves be prepared by the low temperature, solution condensation of one or more aromatic diamines with one or more dibasic acid chlorides as described by Hill et al. in U.S. Pat. 3,094,511, Preston in 3,232,910 and Preston et al. in 3,240,760, in British Pat. 1,104,411, and by P. W. Morgan in Condensation Polymers, Polymer Review, vol. 10, Interscience Publishers, New York (1965); by self condensation of one or more aromatic amino-acid chlorides as described in French Pat. 1,526,745, or by reaction of one or more aromatic aminoacid chlorides with one or more aromatic diamines, and then reacting the resulting intermediate with one or more dibasic acid chlorides. Preferably the polyamide has an inherent viscosity of about 1 to 2.5 as 0.5 gram of polymer in 100 ml. of dimethylacetamide solution containing 4 grams of lithium chloride at 25° C. A representative preparation of a polyamide is as follows:

Preparation of meta-phenylene isophthalamide/
terephthalamide (70/30) copolymer

A resin kettle was swept with dry nitrogen. It was charged with 32 moles of N,N-dimethylacetamide and 2.36 moles of meta-phenylenediamine. The solution was cooled to a temperature of 0° to −10° C. at the start the temperature was maintained below 20° C. while the bulk of a molecularly equivalent amount of molten 70% isophthaloyl chloride −30% terephthaloyl chloride mixture was added in about 0.5-mole increments at 5-minute intervals with agitation. The size of the increments was decreased as the reaction progressed. Finally cooling was stopped and the temperature of the solution was allowed to rise to 40–50° C. Completeness of reaction was checked by spot testing with p-dimethylaminobenzaldehyde (an aromatic end group indicator) in dimethylacetamide until the intense yellow color, which indicates the presence of unreacted amine groups, no longer appeared.

The polymer was isolated by diluting it with dimethylacetamide to a polymer content of about 9% and placing the solution in a high speed Waring Blendor. Crushed ice was added slowly until precipitation began, after which the mixture was stirred rapidly and additional ice was added. The precipitate resulting from this technique was easily filtered, washed, dried and redissolved. Drying was accomplished in a vacuum oven at 80% until the water content was below 4%.

Aromatic polyhydrazides useful in the preparation of the barriers of this invention are prepared by the condensation of one or more dicarboxylic dihydrazides with one or more dibasic acid chlorides as described by A. H. Frazer in U.S. Pat. 3,130,182, by Frazer and Wallenberger in the Journal of Polymer Science, part A, vol. 2, pages 1137–1145 and pages 1147–1156 (1964), and by A. H. Frazer, W. Sweeney and F. T. Wallenberger in the Journal of Polymer Science, part A, vol. 2, pages 1157–1169 (1960). Either the dihydrazide or the dibasic acid chloride should have non-vicinal points of attachment. A represenative preparation of a polyhydrazide is as follows:

Poly(isophthalic-terephthalic hydrazide)

Into a resin kettle inside a dry box was loaded 19.1 grams (0.0985 mole) of isophthalic hydrazide and 250 ml. of hexamethylphosphoramide. The mixture was warmed to 50° C. to dissolve the hydrazide. After cooling to 0° C. in an ice bath, 20 grams (0.0985 mole) of terephthaloyl chloride was added with agitation in two equal portions at an hour interval. After two hours, the cold solution became very thick. The solution was stirred for one hour at room temperature and kept overnight at room temperature. The polymer was poured into water in a blender, chopped up and collected on a filter. It was washed with water to give 32 grams of polymer having an inherent viscosity of 2.15 as tested in dimethyl sulfoxide at 30° C.

Aromatic polysemicarbazides useful in the preparation of the barriers of this invention may be prepared by the reaction of one or more dicarboxylic dihydrazides with one or more aromatic diisocyanates as described by Farago in U.S. Pat. 3,004,945 and by Campbell, Foldi and Farago in the Journal of Applied Polymer Science, volume 2, pages 155–162 (1959).

Polysemicarbazide from methylene-bis(4-phenylisocyanate) and isophthalic dihydrazide Into a five-liter, 4-neck, round-bottom flask fitted with a stirrer, thermometer, argon inlet, a drying tube and a 125 ml. Erlenmeyer flask connected through a piece of Gosch rubber hose was added 58.2 grams (0.3 mole) of isophthalic dihydrazide and 1500 ml. (1652 grams) of dimethyl sulfoxide previously dried over molecular sieves. The stirred solution was continually swept with dry argon gas and cooled to 18° C. methylene-bis(4-phenylisocyanate) (75 grams, 0.3 mole), which had been previously placed in the Erlenmeyer flask, was now added portionwise over a 12-minute period at a rate such that the solution temperature was not allowed to rise any higher than 23° C. Since the solution viscosity increased more than was expected during the addition, a small portion of the methylene-bis-(4-phenylisocyanate) was not added to the solution.

This solution was then poured into a 5-gallon polyethylene bottle along with 8 more charges that had been made in the same way. After mixing, the polymer was isolated using 550 ml. portions which were added to 1600 ml. of ice water in a one-gallon, stainless steel Waring Blendor. Each portion was filtered, washed with water, filtered, washed with methanol, filtered and dried for 62 hours in a vacuum oven held at 45° C. and about 200 mm. absolute pressure with a slight air bleed. The average inherent viscosity of a 0.5% polymer solution in dimethyl sulfoxide at 30° C. was 1.02 and the polymer melt temperature was 229–233° C. with some decomposition.

Aromatic polyureas useful in the preparation of the barriers of this invention may be prepared by the reaction of one or more aromatic diamines with one or more aromatic diisocyanates as described by M. Katz in U.S. Pat. 2,888,438.

Aromatic poly(amide-hydrazides) useful in the barriers of this invention may be prepared by the condensation of one or more aromatic amino carboxylic hydrazides with one or more dibasic acid chlorides as described by B. M. Culbertson and R. Murphy in Polymer Letters, volume 5, pages 807–812 (1967); aromatic poly(diamide-hydrazides) are prepared by reacting one or more aromatic bis(amino acid) hydrazides with one or more dibasic acid chlorides as described by Frost et al. in the Journal of Polymer Science, volume A–1, No. 6, pages 215–233 (1968); and aromatic poly(diamide-dihydrazides) may be prepared by first reacting one or more nitro aromatic acid chlorides with one or more dicarboxylic dihydrazides and then hydrogenating the resulting aromatic dinitrodihydrazide to an aromatic diaminodihydrazide. The aromatic diaminodihydrazide is then condensed with one or more dibasic acid chlorides to give the aromatic poly(diamide-dihydrazide) as described by Frost et al. in the Journal of Polymer Science, vol. A–1, No. 6, pages 215 to 233 (1968).

Additional organic nitrogen-linked, aromatic, substantially linear condensation polymers which are especially useful in accordance with this invention can be prepared in which more than one type of divalent, nitrogen-containing, hydrophilic, linking group is present in a random sequence. Such polymers are preferred and are prepared by using a mixture of three or more functionally different starting materials. For example, a random poly(amide-hydrazide) is obtained by mixing one or more dicarboxylic dihydrazides with one or more aromatic diamines and one or more dibasic acid chlorides; by mixing one or more aromatic diamines with one or more amino carboxylic hydrazides and one or more dibasic acid chlorides; or by mixing one or more amino carboxylic hydrazides with one or more dicarboxylic dihydrazides and one or more dibasic acid chlorides, as well as other combinations.

Further, polyamides or polyhydrazides can be converted into their thio analogs by treatment with $P_2S_5$ by known procedures.

EXAMPLE V

To 10.520 grams of ethylene-bis-(3-methoxy-4-oxybenzhydrazide) in 250 ml. of dimethyl acetamide cooled to 0° C. under a blanket of argon gas (and with anhydrous conditions) was added slowly 10.15 grams of a molten mixture of 70% isophthaloyl chloride and 30% terephthaloyl chloride. The solution was stirred at 0° C. for a few hours and then drowned into ice water in a blender. The polymer was shredded, collected on a filter and washed acid free with water. The filter cake was washed with aqueous sodium bicarbonate, water and methanol, in that order. The polymer dried at 120° C. in a vacuum oven weighed 21.5 g. (inherent viscosity in dimethyl acetamide at 30° C. at 0.5%=0.84). This polymer has values of $\bar{N}_R/\bar{S}=6.0$, $f_M=0.11^7$, P.I.=0.

A solution of 5 grams of this polymer in 33 ml. of dimethyl-acetamide containing 7% by weight of lithium nitrate was filtered under pressure. The solution contained about 45% lithium nitrate based on the weight of polymer. A membrane was cast on an "Inconel" plate heated to 100° C. on an electric hot plate in a hood with a 25 ml. knife. The membrane on the metal plate was dried at 100° for 3.5 minutes, cooled in air for about one minute, and then inserted into a large pan containing ice water. The membrane was removed from the metal plate and stored immersed in water. The air slide of the film was mounted toward the feed solution in a permeation cell. After a four-day test employing synthetic sea water (ASTM Test D-1141 recipe) at 1000 p.s.i., and 25° C. this membrane showed the following permeation properties. $W_M=26,610$; $W_f=17.5$; percent CI passage $=3$.

The hydrazide used in making the above polymer was prepared as follows: To a solution of 65 grams (1 mole) of potassium hydroxide (87%) in 340 ml. of methanol was added 182.2 grams (1 mole) of methyl vanillate and 46 ml. (0.5 mole) of 1,2-dibromoethane. This mixture was stirred under reflux for 20 hours. After adding another 6 ml. of 1,2-dibromoethane, the mixture was stirred under reflux for a second 20 hours. After cooling in an ice bath, the product containing potassium bromide was collected on a filter. The filter case was slurried in cold water, collected on a filter and dried at 100° C. in an oven; weight 150 grams. Recrystallization from toluene afforded 123 grams of the diester, melting point 180–1° C.

A mixture of 90 grams of dimethyl ethylene-bis-(3-methoxy-4-oxybenzoate), 600 ml. of toluene and 150 ml. of 95% hydrazine was stirred at 90–95° C. for 15 hours. After cooling to room temperature, the product was collected on a filter and washed thoroughly with hot isopropanol; weight 89 grams, melting point 236–7° C. OCNB–151–147A.

It is understood that the terms "barrier" and "membrane" are equivalent terms as used herein.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A permselective polymeric membrane consisting essentially of at least one synthetic, organic, nitrogen-linked, aromatic, substantially linear, condensation polymer represented by the formula $$—(LR)_n—$$

wherein (a) each L independently is a divalent linking group of the formula $—(A_iB_jA_kB_lA_m)—$ wherein (1) A is

and

or vice versa; each X independently is O or S; each Z independently is H, lower alkyl, or phenyl, provided that at least about ¼ of the Z's in the polymer are H; and all non-terminal

's occur in pairs;

(2) $i$ and $j$ each represent the numerals 1 or 2; $k$, $l$, and $m$ each represent the numerals 0, 1, or 2; provided that if $l=0$, then $m=0$; and if $k=0$, then $l=0$; and further that $i+j+k+l+m \leq 8$;

(b) each R independently is a divalent organic radical, both of whose terminal atoms are carbon atoms, at least about ½ of all such terminal atoms bonded to

and at least about ⅔ of all such terminal atoms bonded to

in the L links being members of aromatic nuclei; and such that (1) $(\bar{N}_R)/(\bar{s})$ is less than about 10,
(2) $f_M$ is less than about ⅕, and
(3) P.I. is less than about 1/500, where $N_R = N^o{}_R - 10N_I - N_H$
$N^o{}_R =$ (number of atoms in R, exclusive of H-atoms) $<50$
$N_I =$ number of ionic groups in R
$N_H =$ number of H-bonding units contributed by polar groups in R
$\bar{N}_R =$ average value of $N_R$ for the polymer
$s = \frac{1}{2}$ [(number of

groups in L) $+1$]
$\bar{s} =$ average value of $s$ for the polymer $$f_M = \frac{\text{(number of single-strand —M— links in the polymer chain)}}{\text{(total number of atoms, exclusive of H-atoms, in polymer chain)}}$$

—M—= any atoms in R linking the polymer chain solely through two single bonds $$\text{P.I.} = \frac{\text{(total number of pendent ionic groups in the polymer)}}{\text{(polymer molecular weight)}}$$

(c) $n$ is an integer sufficiently large to provide film-forming molecular weight, and
(d) the polymer has a solubility of at least about 10% by weight in a medium consisting of 0–3% by weight of lithium chloride in a solvent selected from the group consisting of dimethylacetamide, dimethyl sulfoxide, N-methylpyrrolidone, hexamethylphosphoramide, and mixtures thereof at 25° C., said membrane having
  (a) a water permeability of at least 350, and
  (b) a solute passage through the membrane of less than 20%.

2. The membrane of claim 1 in which the membrane is an asymmetric desalination membrane characterized by having a skin layer having a crystal violet surface-dyeability of less than about 0.5 overlying a substrate having a p-nitroaniline dyeability of at least about 0.7.

3. The membrane of claim 2 wherein the L groups are selected from amides, hydrazides, acyl hydrazides, ureas, semi-carbazides, oxamides, N-alkyl substituted analogs of the above, and mixtures of the above.

4. The membrane of claim 3 wherein all terminal atoms of R that are bonded to L are carbon atoms and are members of aromatic nuclei.

5. The membrane of claim 4 wherein the polymer has an index of refraction greater than about 1.60.

6. The membrane of claim 5 wherein the polymer has an $\bar{N}_R/\bar{s}$ value of less than about 7.

7. The membrane of claim 6 wherein the polymer has an $f_M$ value of less than about 1/10.

8. The membrane of claim 4 in the form of a hollow fiber.

9. The membrane of claim 4 wherein the L groups have a structure selected from the class consisting of

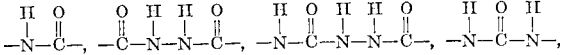

or mixtures thereof.

10. The membrane of claim 9 wherein R is a divalent carbocyclic or heterocyclic aromatic group represented by the symbol Ar; or a divalent group having the formula —$Ar_1$—Y—$Ar_2$—, in which $Ar_1$ and $Ar_2$ are each, independently, divalent monocyclic carbocyclic or heterocyclic aromatic groups;

wherein Ar, $Ar_1$ and $Ar_2$ can be substituted with up to two $C_1$-$C_3$ alkoxy, $C_1$-$C_3$ alkyl, amino, hydroxyl, $C_1$-$C_3$ mono- or di-alkyl amino, carboxamide, $C_1$-$C_3$ mono- or di-alkyl carboxamide, halogen, sulfonate, carboxylate or $C_1$-$C_3$ trialkyl ammonium groups;

and Y is —O—(oxygen); —S—(sulfur);

$$-\overset{O}{\underset{}{\overset{\|}{S}}}-$$

—$SO_2$—; —O—B—O—; —(O—B)$_2$O—;

$$-\overset{O}{\underset{T}{\overset{\|}{P}}}-$$

alkylene (straight or branched chain) of 1–4 carbon atoms; —NT—; or a five- or six-membered heterocyclic group having from 1–3 heteroatoms selected from O, N or S; in which T above is H, alkyl of 1–6 carbons or phenyl; B above is alkylene (straight or branched chain) or 2–4 carbon atoms;

with the proviso that the two linking bonds in all divalent aromatic groups are non-vicinol to one another or to any linking Y group.

11. The membrane of claim 10 wherein the R groups are represented by structures selected from the class consisting of

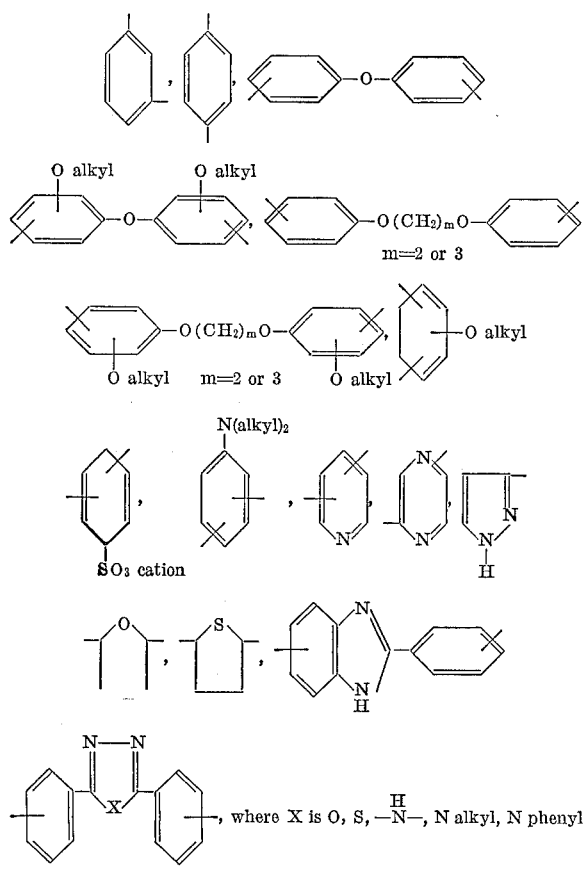

and mixtures of the above.

12. The membrane of claim 11 wherein the L and the R groups are each composed of a mixture of at least two of the respective L and the respective R groups set forth.

13. The membrane of claim 12 wherein L is selected from

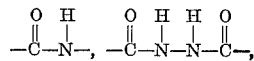

or a mixture of both.

14. The membrane of claim 13 wherein R is selected from the group

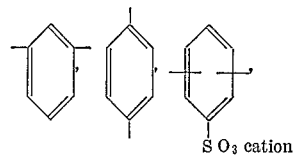

or a mixture thereof.

15. The membrane of claim 1 wherein the L groups are selected from amides, hydrazides, acyl hydrazides, ureas, semi-carbazides, oxamides, N-alkyl substituted analogs of the above, and mixtures of the above.

16. The membrane of claim 15 wherein all terminal atoms of R that are bonded to L are carbon atoms and are members of aromatic nuclei.

17. The membrane of claim 16 wherein the polymer has an index of refraction greater than about 1.60.

18. The membrane of claim 17 wherein the polymer has an $\overline{N}_R/\overline{S}$ value of less than about 7.

19. The membrane of claim 18 wherein the polymer has an $f_M$ value of less than about 1/10.

20. The membrane of claim 16 in the form of a hollow fiber.

21. The membrane of claim 16 wherein the L groups have a structure selected from the class consisting of

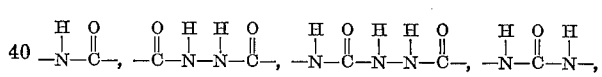

or mixtures thereof.

22. The membrane of claim 21 wherein R is a divalent carbocyclic or heterocyclic aromatic group represented by the symbol Ar; or a divalent group having the formula —$Ar_1$—Y—$Ar_2$—, in which $Ar_1$ and $Ar_2$ are each, independently, divalent monocyclic carbocyclic or heterocyclic aromatic groups;

wherein Ar, $Ar_1$ and $Ar_2$ can each be substituted with up to two $C_1$-$C_3$ alkoxy, $C_1$-$C_3$ alkyl, amino, hydroxyl, $C_1$-$C_3$ mono- or di-alkyl amino, carboxmide, $C_1$-$C_3$ mono- or di-alkyl carboxamide, halogen, sulfonate, carboxylate or $C_1$-$C_3$ trialkyl ammonium groups;

and Y is —O—(oxygen); —S—(sulfur);

—$SO_2$—; —O—B—O; (O—B)$_2$O—;

alkylene (straight or branched chain) of 1–4 carbon atoms; —NT—; or a five- or six-membered heterocyclic group having from 1–3 hetero-atoms selected from O, N or S; in which T above is H, alkyl of 1–6 carbons or phenyl; B above is alkylene (straight or branched chain) of 2–4 carbon atoms;

with the proviso that the two linking bonds in all divalent aromatic groups are non-vicinal to one another or to any linking Y group.

23. The membrane of claim 22 wherein the R groups are represented by structures selected from the class consisting of

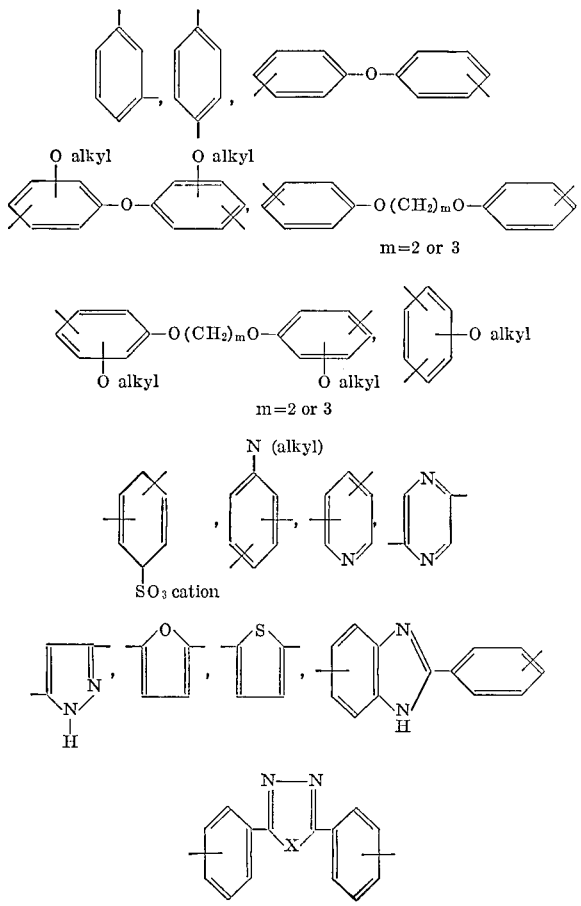

where X is O, S, $$-\overset{H}{\underset{}{N}}-$$

N alkyl, N phenyl, and mixtures of the above.

24. The membrane of claim 23 wherein the L and the R groups are each composed of a mixture of at least two of the respective L and the respective R groups set forth.

25. The membrane of claim 24 wherein L is selected from $$-\overset{O}{\overset{\|}{C}}-\overset{H}{\underset{|}{N}}-, \quad -\overset{O}{\overset{\|}{C}}-\overset{H}{\underset{|}{N}}-\overset{H}{\underset{|}{N}}-\overset{O}{\overset{\|}{C}}-$$

or a mixture of both.

26. The membrane of claim 25 wherein R is selected from the group

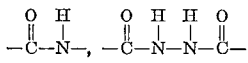

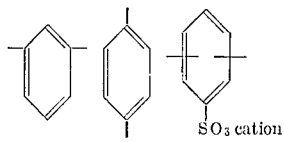

or a mixture thereof.

27. A process for preparing the permselective membrane of claim 1 which comprises extracting an unextracted membrane composed of
(a) about 25 to 80%, based on the weight of solvent and polymer, of resinous, aromatic, nitrogen-containing, substantially linear, condensation polymer of the formula $(R-L)_n$ in which R and L are defined as in claim 1, dissolved in
(b) about 20 to 75% of organic polar solvent for the polymer, based on the weight of solvent and polymer,
(c) 0 to 30% by volume of dissolved salt, based on the polymer, and
(d) 0 to 25% of water, based on the weight of polymer, with a rinse medium which
  (a) is miscible with the organic solvent,
  (b) dissolves the salt,
  (c) is essentially chemically inert toward the polymer, and
  (d) is essentially a non-solvent for the polymer at $-20°$ to $50°$ C., for a time sufficient to extract 75 to 100% of the solvent and 75 to 100% of the salt.

28. A process for preparing the permselective membrane of claim 2 which comprises extracting an unextracted membrane composed of
(a) about 25 to 80%, based on the weight of solvent and polymer, of resinous, aromatic, nitrogen-containing, substantially linear, condensation polymer of the formula $(R-L)_n$ in which R and L are defined as in claim 2, dissolved in
(b) about 20 to 75% of organic polar solvent for the polymer, based on the weight of solvent and polymer,
(c) 0 to 30% by volume of dissolved salt, based on the polymer, and
(d) 0 to 25% of water, based on the weight of polymer, with a rinse medium which
  (a) is miscible with the organic solvent,
  (b) dissolves the salt,
  (c) is essentially chemically inert toward the polymer, and
  (d) is essentially a non-solvent for the polymer at $-20°$ to $50°$ C.

for a time sufficient to extract 75 to 100% of the solvent and 75 to 100% of the salt.

29. A process for preparing the permselective membrane of claim 15 which comprises extracting an unextracted membrane composed of
(a) about 25 to 80%, based on the weight of solvent and polymer, of resinous, aromatic, nitrogen-containing, substantially linear, condensation polymer of the formula $(R-L)_n$ in which R and L are defined as in claim 4, dissolved in
(b) about 20 to 75% of organic polar solvent for the polymer, based on the weight of solvent and polymer,
(c) 0 to 30% by volume of dissolved salt, based on the polymer, and
(d) 0 to 25% of water, based on the weight of polymer, with a rinse medium which
  (a) is miscible with the organic solvent,
  (b) dissolves the salt,
  (c) is essentially chemically inert toward the polymer, and
  (d) is essentially a non-solvent for the polymer at $-20°$ to $50°$ C.

for a time sufficient to extract 75 to 100% of the solvent and 75 to 100% of the salt.

30. The process of claim 27 in which the unextracted membrane is obtained by forming dope containing the polymer and solvent, and partially drying the formed dope thereby evaporating solvent.

31. The method of claim 27 in which, after extraction with the rinse medium, the membrane is continuously stored in contact with water.

32. A process for the permselective separation of a fluid mixture or solution which comprises
(a) contacting one surface of the membrane of claim 1 with said fluid mixture or solution, and
(b) recovering from the other side of the membrane fluid which has passed through the membrane and which contains a reduced amount of one component of the mixture or solution.

33. A process for the permselective separation of a liquid mixture or solution which comprises
(a) contacting one surface of the membrane of claim 2 with said liquid, and
(b) recovering from the other side of the membrane a liquid which has passed through the membrane and which contains a reduced amount of one component of the mixture or solution.

34. The process of claim 33 wherein the liquid is water containing dissolved salts.

35. A process for the permselective separation of a liquid mixture or solution which comprises
   (a) contacting the outside of the hollow fiber membrane of claim 8 with said liquid and
   (b) recovering from the inside of the membrane liquid which has passed through the membrane and which contains a reduced amount of one component of the mixture or solution.

36. A process for the permselective separation of a liquid mixture or solution which comprises
   (a) contacting the outside of the hollow fiber membrane of claim 20 with said liquid and
   (b) recovering from the inside of the membrane liquid which has passed through the membrane and which contains a reduced amount of one component of the mixture or solution.

37. In a permeator for separating fluid mixtures which comprises, in combination, a fluid tight housing defining an enclosed fluid separation zone, at least one permselective membrane in said housing, support means cooperating with said housing and said membrane to support said membrane in operative relationship in said separation zone, inlet means cooperating with said housing for directing a feed fluid against one surface of said membrane, and exit means cooperating with said housing for collecting and removing a permeated fluid from the other surface of said membrane, the improvement in which the permselective membrane is the membrane of claim 1.

38. In a permeator for separating fluid mixtures which comprises, in combination, a fluid tight housing defining an enclosed fluid separation zone, at least one permselective membrane in said housing, support means cooperating with said housing and said membrane to support said membrane in operative relationship in said separation zone, inlet means cooperating with said housing for directing a feed fluid against one surface of said membrane, and exit means cooperating with said housing for collecting and removing a permeated fluid from the other surface of said membrane, the improvement in which the permselective membrane is the membrane of claim 2.

39. In a permeator for separating fluid mixtures which comprises, in combination, a fluid tight housing defining an enclosed fluid separation zone, at least one permselective membrane in said housing, support means cooperating with said housing and said membrane to support said membrane in operative relationship in said separation zone, inlet means cooperating with said housing for directing a feed fluid against one surface of said membrane, and exit means cooperating with said housing for collecting and removing a permeated fluid from the other surface of said membrane, the improvement in which the permselective membrane is the membrane of claim 7.

40. In a permeator for separating fluid mixtures which comprises, in combination, a fluid tight housing defining an enclosed fluid separation zone, at least one permselective membrane in said housing, support means cooperating with said housing and said membrane to support said membrane in operative relationship in said separation zone, inlet means cooperating with said housing for directing a feed fluid against one surface of said membrane, and exit means cooperating with said housing for collecting and removing a permeated fluid from the other surface of said membrane, the improvement in which the permselective membrane is the membrane of claim 19.

References Cited
UNITED STATES PATENTS

| | | | |
|---|---|---|---|
| 3,287,324 | 11/1966 | Sweeny | 260—78 |
| 3,310,488 | 3/1967 | Loeb et al. | 210—22 |
| 3,423,491 | 1/1969 | McLain et al. | 210—321X |
| 3,442,002 | 5/1969 | Geary et al. | 210—321X |

JAMES L. DECESARE, Primary Examiner

U.S. Cl. X.R.

210—321, 500; 260—47, 65, 77.5, 78

PO-1050
(5/69)

UNITED STATES PATENT OFFICE
CERTIFICATE OF CORRECTION

Patent No. 3,567,632  Dated  March 2, 1971

Inventor(s)  John William Richter
Harvey Herbert Hoehn

It is certified that error appears in the above-identified patent and that said Letters Patent are hereby corrected as shown below:

Column 31, line 52, after "and" insert -- B is --. Column line 7, after "can" insert -- each --; and line 29, change "vicinol" to -- vicinal --.  Column 34,
line 60, change "(O-B)," to -- $(O-B)_2$ --.

Signed and sealed this 22nd day of June 1971.

(SEAL)
Attest:

EDWARD M. FLETCHER, JR.
Attesting Officer

WILLIAM E. SCHUYLER, J
Commissioner of Patent